US012142472B2

(12) United States Patent
Cooks et al.

(10) Patent No.: US 12,142,472 B2
(45) Date of Patent: *Nov. 12, 2024

(54) ELECTROPHORETIC MASS SPECTROMETRY PROBES AND SYSTEMS AND USES THEREOF

(71) Applicants: Purdue Research Foundation, West Lafayette, IN (US); AMGEN INC., Thousand Oaks, CA (US)

(72) Inventors: Robert Graham Cooks, West Lafayette, IN (US); Tawnya Flick, Thousand Oaks, CA (US)

(73) Assignees: Purdue Research Foundation, West Lafayette, IN (US); AMGEN INC., Thousand Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,114

(22) Filed: Nov. 16, 2023

(65) Prior Publication Data

US 2024/0087866 A1 Mar. 14, 2024

Related U.S. Application Data

(63) Continuation of application No. 17/979,121, filed on Nov. 2, 2022, now Pat. No. 11,854,781, which is a (Continued)

(51) Int. Cl.
*H01J 49/04* (2006.01)
*G01N 27/447* (2006.01)
(Continued)

(52) U.S. Cl.
CPC .... *H01J 49/0431* (2013.01); *G01N 27/44717* (2013.01); *G01N 27/4473* (2013.01); *H01J 49/165* (2013.01); *G01N 30/7266* (2013.01)

(58) Field of Classification Search
CPC ............... H01J 49/0431; H01J 49/0445; H01J 49/165; H01J 49/167; G01N 27/44717; G01N 27/4473; G01N 30/7266
See application file for complete search history.

(56) References Cited

U.S. PATENT DOCUMENTS

| 5,393,975 | A |   | 2/1995 | Hail et al. |
| 5,572,023 | A | * | 11/1996 | Caprioli ............... H01J 49/167 250/281 |
| 5,644,131 | A |   | 7/1997 | Hansen |
| 5,917,184 | A |   | 6/1999 | Carson et al. |

(Continued)

FOREIGN PATENT DOCUMENTS

WO 2009/023361 A3 5/2009

OTHER PUBLICATIONS

Bonner, 1977, The Cylindrical Ion Trap, International Journal of Mass Spectrometry and Ion Physics, 24(3):255-269.
(Continued)

*Primary Examiner* — Sean M Luck
(74) *Attorney, Agent, or Firm* — Brown Rudnick LLP; Adam M. Schoen

(57) ABSTRACT

The invention generally relates to electrophoretic mass spectrometry probes and systems and methods of uses thereof. In certain aspects, the invention provides a mass spectrometry probe having a hollow body with a distal tip, an electrically conductive hollow conduit, and an electrode. The electrically conductive hollow conduit may be operably coupled to a reservoir and a power source, and the electrically conductive hollow conduit may be configured to transport a liquid sample into the hollow body and polarize the liquid sample as it flows through the electrically conductive hollow conduit and into in the hollow body. The electrode and the electrically conductive hollow conduit are disposed within the hollow body (e.g., at different heights within the hollow body).

10 Claims, 38 Drawing Sheets

Figure 1:
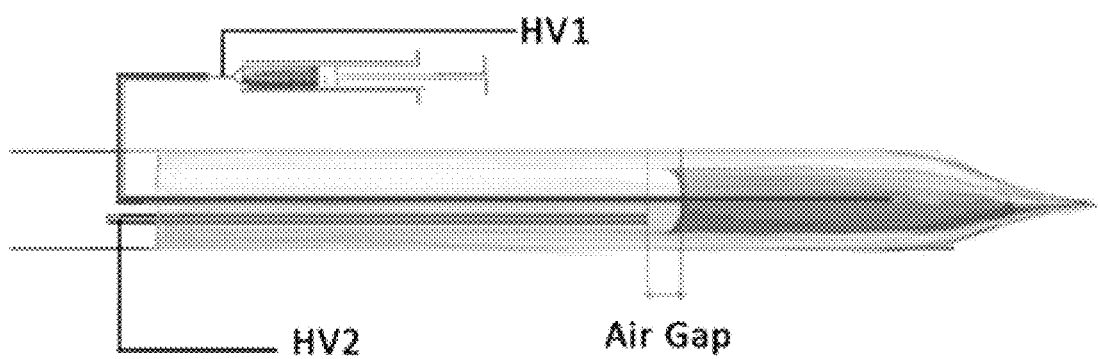

Related U.S. Application Data continuation of application No. 16/020,524, filed on Jun. 27, 2018, now abandoned.

(60) Provisional application No. 62/532,568, filed on Jul. 14, 2017.

(51) Int. Cl.
*H01J 49/16* (2006.01)
*G01N 30/72* (2006.01)

(56) References Cited

U.S. PATENT DOCUMENTS

| | | | |
|---|---|---|---|
| 6,274,867 B1 | 8/2001 | Wells et al. | |
| 6,326,616 B1 | 12/2001 | Andrien, Jr. et al. | |
| 6,458,597 B1 | 10/2002 | Andrien, Jr. et al. | |
| 6,838,666 B2 | 1/2005 | Ouyang et al. | |
| 7,960,711 B1 | 6/2011 | Sheehan et al. | |
| 8,063,362 B1 | 11/2011 | Dressler et al. | |
| 8,227,750 B1 | 7/2012 | Zhu et al. | |
| 8,304,718 B2 | 11/2012 | Ouyang et al. | |
| RE44,887 E * | 5/2014 | Whitehouse | H01J 49/165 436/140 |
| 8,754,370 B1 | 6/2014 | Wang et al. | |
| 9,165,754 B2 | 10/2015 | Owen et al. | |
| 9,377,445 B2 | 6/2016 | Satake et al. | |
| 9,941,089 B2 | 4/2018 | Williams et al. | |
| 2002/0190203 A1 | 12/2002 | Valaskovic et al. | |
| 2003/0196895 A1 | 10/2003 | Neususs et al. | |
| 2005/0258360 A1 | 11/2005 | Whitehouse et al. | |
| 2006/0057556 A1 | 3/2006 | Janini et al. | |
| 2007/0101934 A1 | 5/2007 | Nishio et al. | |
| 2007/0120066 A1 | 5/2007 | Suzuki | |
| 2008/0315083 A1 | 12/2008 | Lubda et al. | |
| 2010/0025575 A1 | 2/2010 | Demmons et al. | |
| 2010/0155496 A1 | 6/2010 | Stark et al. | |
| 2011/0040147 A1 | 2/2011 | O'Dea et al. | |
| 2011/0042560 A1 | 2/2011 | Ouyang et al. | |
| 2012/0079894 A1 | 4/2012 | Van Berkel et al. | |
| 2012/0153143 A1 | 6/2012 | Kennedy et al. | |
| 2012/0223225 A1 | 9/2012 | Russell et al. | |
| 2013/0140180 A1 | 6/2013 | Dovichi et al. | |
| 2013/0292581 A1 * | 11/2013 | Russell | G01N 30/7266 250/423 R |
| 2014/0305801 A1 | 10/2014 | Peterson et al. | |
| 2014/0312244 A1 | 10/2014 | Shiea | |
| 2015/0233877 A1 | 8/2015 | Dovichi et al. | |
| 2015/0311056 A1 | 10/2015 | Dovichi et al. | |
| 2016/0126080 A1 * | 5/2016 | Kertesz | H01J 49/04 250/288 |
| 2016/0196965 A1 | 7/2016 | Satake et al. | |
| 2016/0225601 A1 | 8/2016 | Bajic et al. | |
| 2016/0266017 A1 | 9/2016 | Kennedy et al. | |
| 2016/0268113 A1 | 9/2016 | Brown et al. | |
| 2016/0300703 A1 | 10/2016 | Hasegawa et al. | |
| 2017/0025262 A1 | 1/2017 | Xu et al. | |
| 2018/0040464 A1 | 2/2018 | Cooks et al. | |
| 2018/0158664 A1 | 6/2018 | Xu et al. | |

OTHER PUBLICATIONS

Cassou, 2014, Desaltinig Protein Ions in Native Mass Spectrometry Using Supercharging Reagents, Analyst, 139(19):4810-4819.
Cavanagh, 2003, In-Line Desalting Mass Spectrometry for the Sstudy of Noncovalent Biological Complexes, Anal. Chem, 75:3281-3286.
Chen, 2011, On-Line Electrodialytic Salt Removal in Electrospray Ionization Mass Spectrometry of Proteins, Anal. Chem., 83:1015-1021.
Clarke, 2015, Desalting large protein complexes during native electrospray mass spectrometry by addition of amino acids to the working solution, Analyst, 140:2679-2686.
DeMuth, 2015, Electrospray Droplet Exposure to Organic Vapors: Metal Ion Removal from Proteins and Protein Complexes, Anal. Chem., 87:1210-1218.
Deng, 2001, Chip-Based Capillary Electrophoresis/Mass Spectrometry Determination of Carnitines in Human Urine, Anal. Chem., 73:639-646.
Enke, 1997, A Predictive Model for Matrix and Analyte Effects in Electrospray Ionization of Singly-Charged Ionic Analytes, Anal. Chem, 69:4885-4893.
Flick, 2012, Solution Additives that Desalt Protein Ions in Native Mass Spectrometry, Anal. Chem. 84:7511-7517.
Fornea, 2006, Capillary-Channeled Polymer Fibers as a Stationary Phase for Desalting of Protein Solutions for Electrospray Ionization Mass Spectrometry Analysis, Anal. Chem, 78:5617-5621.
Fountain, 2004, Electrospray ionization mass spectrometric analysis of nucleic acids using high-throughput on-line desalting, Rapid Commun. Mas Spectrom., 18:1295-1302.
Fuery, 2013, Ion suppression; A critical review of causes, evaluation, prevention and applications, Talanta, 115:104-122.
Gao, 2006, Handheld Rectilinear Ion Trap Mass Spectrometer, Anal. Chem., 78:5994-6002.
Gao, 2008, Design anc Characterization of a Multisource Hand-Held Tandem Mass Spectrometer, Z. Anal. Chem, 80:7198-7205.
Gong, 2017, Boosting the Signal Intensity of Nanoelectrospray Ionization by Using a Polarity-Reversing High-Voltage Strategy, Anal. Chem., 89:7009-7016.
Hagar, 2002, A new linear ion trap mass spectromer, Rapid Communi. Mass Spectrometry, 16(6):512-526.
Hendricks, 2014, Autonomous in-situ analysis and real-time chemical detection using a backpack miniature mass spectrometer: concept, instrumentation development, and performance, Anal Chem, 86:2900-2908.
Hou, 2011, Sampling Wand for an Ion Trap Mass Spectrometer, Anal. Chem, 83:1857-1861.
Hu, 2017, Effect of Nanoemitters on Suppressing the Formation of Metal Adduct Ions in Electrospray Ionization Mass Spectrometry, Anal. Chem., 89:1838-1845.
Iavarone, 2004, Buffer Loading for Counteracting Metal Salt-Induces Signal Suppression in Electrospray Ionization, Anal. Chem, 76(14):3944-3950.
Jiang, 2003, A highly efficient and automated method of purifying and desalting PCR products for analysis by electrospray ionization mass spectrometry, Analytical Biochemistry, 316:50-57.
Lazar, 2005, Analysis of the composition of immunoconjugates using size-exclusion chromatography coupled to mass spectrometry, Rapid Commun. Mass Spectrom. 19: 1806-1814.
Li, 1999, Integration of Microfabricated Devices to Capillary Electrophoresis-Electrospray Mass Spectrometry Using a Low Dead Volume Connection: Application to Rapid Analyses of Proteolytic Digest, Anal. Chem., 71:3036-3045.
Li, 2014, Alleviation of ion suppression effect in sonic spray ionization with induced alternating current voltage, J. Mass Spectrom., 49:639-645.
Li, 2014, Mini 12, Miniature Mass Spectrometer for Clinical and other Applications—Introduction and Characterization, Anal. Chem., 86:2909-2916.
Liu, 1996, On-Line Microdialysis Sample Cleanup for Electrospray Ionization Mass Spectrometry of Nucleic Acid Samples, Anal. Chem., 68:3295-3299.
Liu, 1998, On-Line Dual Microdialysis with ESI-MS for Direct Analysis of Complex Biological Samples and Microorganism Lysates, Anal. Chem., 70:1797-1801.
Manduzio, 2010, Comparison of approaches for purifying and desalting polymerase chain reaction products prior to electrospray ionization mass spectrometry, Anal. Biochem, 398:272-274.
Mathur, 2005, A Method for Screening Enzyme Inhibitors Using Size Exclusion Chromatography and ESI-LC-MS/MS, J. Biololecular Screening, 10(1); 30-35.
Pan, 2003, The Effect of Small Cations on the Positive Electrospray Responses of Proteins at Low pH, Anal. Chem, 75:5468-5474.
Pendela, 2009, LC-MS of treptomycin following desalting of a nonvolatile mobile phase and pH gradient, J. Seo. Sci., 32:3418-3424.

(56) References Cited

OTHER PUBLICATIONS

Sokol, 2011, Miniature mass spectrometer equipped with electrospray and desorption electrospray ionization for direct analysis of organics from solids and solutions, Int. J. Mass Spectrum., 306:187-195.
Susa, 2017, Small Emitter Tips for Native Mass Spectrometry of Proteins and Protein Complexes from Nonvolatile Buffers That Mimic the Intracellular Environment, Anal. Chem., 89:3116-3122.
Tang, 2004, Charge Competition and the Linear Dynamic Range of Detection in Electrospray Ionization Mass Spectrometry, J. Am. Soc. Mass Spectrom., 15: 1416-1423.
Tubaon, 2017, One-step selective electrokinetic removal of inorganic anions from small vols. and its application as sample clean-up for mass spectrometric techniques, J. Chromatogr. A 1488:134-139.
Tubaon, 2017, Sample Clean-up Strategies for ESI Mass Spectrometry Applications in Bottom-up Proteomics: Trends from 2012 to 2016, Proteomics, 17:1700011.
Vrouwe, 2000, Chip-based capillary electrophoresis with an electrodeless nanospray interface, Rapid Commun. Mass Spectrom., 14:1682-1688.
Wang, 1994, Effect of Solution Ionic Strength on Analyte Charge State Distributions in Positive and Negative Ion Electrospray Mass Spectrometry, Anal. Chem., 66:3702-3708.
Wang, 2017, Monitoring Glycosylation Profile and Protein Titer in Cell Culture Samples Using ZipChip CE-MS, J. Anal. Bioanal. Tech., 8(2): 1000359.
Wei, 2013, Rapid Removal of Matrices from Small-Volume Samples by Step-Voltage Nanoelectrospray, Angew. Chem. Int. Ed., 52:11025-11028.
Wilson, 2005, Ultrarapid Desalting of Protein Solutions for Electrospray Mass Spectrometry in a Microchannel Laminar Flow Device, Anal. Chem, 77:6887-6894.
Zhang, 2017, Electro-kinetic assisted electrospray ionization for enhanced complex sample analysis, Talanta, 164:45-51.

\* cited by examiner

ELECTROPHORETIC MASS SPECTROMETRY PROBES AND SYSTEMS AND USES THEREOF

RELATED APPLICATION

The present application is a continuation of U.S. nonprovisional application Ser. No. 17/979,121, filed Nov. 2, 2022, which is a continuation of U.S. nonprovisional application Ser. No. 16/020,524, filed Jun. 27, 2018, which claims the benefit of and priority to U.S. provisional application Ser. No. 62/532,568, filed Jul. 14, 2017, the content of each of which is incorporated by reference herein in its entirety.

FIELD OF THE INVENTION

The invention generally relates to electrophoretic mass spectrometry probes and systems and methods of uses thereof.

BACKGROUND

Mass spectrometers are sensitive tools used to measure small and large analyte molecules according to their mass-to-charge ratios (m/z). These compounds can exist as protonated or deprotonated ions or can be bound to adventitious or deliberately added anions or cations in the spray solvent during ionization. The phenomenon of adduct formation between cations and anions and analyte molecules convolutes the data and can have deleterious impacts on the performance of the mass spectrometer especially in high ionic strength media.

Techniques to address this problem use polymeric gels or liquid chromatography to remove salts and related interferences. Chemical modifiers such as acids or bases too can be added to reduce the likelihood of adduct formation; however, under high salt conditions, this treatment has minimal effect.

SUMMARY

The invention addresses this problem and provides dual-electrode mass spectrometry probes (e.g., nano electrospray sources) to rapidly desalt a spray solution for both cationic and anionic species. Peptides, proteins, and pharmaceutical drugs all yielded improved results after the desalting process.

Aspects of the invention make use of electrophoretic forces to displace interfering solution-phase ions prior to chemical analysis, i.e., move solution-phase ions to a region of the solution remote from the sprayer. The probes of the invention employ two electrodes to create an electrophoretic field by means of which ions, such as $H^+$, $Na^+$, $K^+$, $Br^-$, $Cl^-$, Acetate$^-$, Formate$^-$, etc., can be manipulated. Except for $H^+$ and $OH^-$, these solution phase ions cause deleterious effects during mass spectrometric (MS) analysis by causing a single analyte (M) to have multiple signals (e.g., $M+H^+$, $M+Na^+$, and $M+K^+$), or by suppressing analyte signals altogether. These adducts not only lower the signal of the analyte, but also result in cluster formation, congested spectra and reduced sensitivity of the MS analyzer. The electrophoretic probes of the invention remove ions from the region from which the analytical spray occurs. The removal is not permanent but persists for long periods and as such it allows mass spectrometry to be performed under normal conditions.

To perform the desalting process, a hollow conduit and an electrode are inserted into a hollow body of a mass spectrometry probe having a distal tip. The hollow conduit is electrically conductive and may be operably coupled to a power source and a reservoir that holds a liquid sample. A distal end of the hollow conduit is positioned in the hollow body to be in contact with the liquid sample that is expelled from the hollow conduit. A separate electrode is placed at the rear of the emitter, not in contact with the liquid sample but connected inductively (e.g., a distal end of the electrode is located at a different distance from the distal tip of the hollow body than a distal end of the hollow conduit, e.g., farther away)). A voltage is applied to the hollow conduit as it transports the liquid sample from the reservoir into the hollow body. The hollow conduit polarizes the liquid sample as the liquid sample flows through the hollow conduit and into the hollow body. This generates a charge body of solution which is connected via the external hollow conduit to one pole of the power supply. In this manner, the liquid sample may act as an electrode. When the appropriate electrical potentials (e.g., DC potentials) are applied to the electrode, the ions migrate to the rear of the capillary, away from the tip of the hollow body. After a short period, the electrode is turned off while voltage is still supplied to the hollow conduit, which electrical charge continues to be imparted to the liquid sample in the hollow body, even if there is not flow or liquid in the hollow conduit. The spectrum generated has signals related primarily to protonated molecules ($M+H^+$) and minimal signal resulting from cation adducts of the molecule or from cationic salt clusters. The same experiment can be applied to negative ions using an opposite polarity on the electrodes. The mass spectrometry probe of the invention has been used to improve the analytical performance in the analysis of therapeutic pharmaceuticals, peptides, proteins, and contaminants often found in waste streams.

In certain aspects, the invention provides a mass spectrometry probe having a hollow body with a distal tip, an electrically conductive hollow conduit, and an electrode. The electrically conductive hollow conduit may operably coupled to a reservoir (e.g., sample reservoir) and a power source, and the electrically conductive hollow conduit is configured to transport a liquid sample from the reservoir and into the hollow body and polarize the liquid sample as it flows through the electrically conductive hollow conduit and into in the hollow body. The electrode and the electrically conductive hollow conduit are disposed within the hollow body. In certain aspects, the mass spectrometry probe is interfaced with a mass spectrometer to form a system of the invention. Any mass spectrometer may be used with systems of the invention, such as a bench-top or miniature mass spectrometer. In certain embodiments, the mass spectrometer is a miniature mass spectrometer.

In certain embodiments, the hollow body is a unitary hollow body. "Unitary" refers to forming a single or uniform entity. In the context of the invention, "unitary" refers to the fact that walls of the body of the mass spectrometry probe include no breaks, cuts, or disconnected regions. Rather, the walls of the probe run continuously from the distal tip of the probe to a rear of the probe without any breaks, cuts, or disjointed regions. In that manner, the mass spectrometry probes can operate without any connector that would be required to connect to parts of a disjointed non-unitary probe body.

The invention can be used with numerous types of mass spectrometry probe bodies. An exemplary mass spectrometry probe body is a nanospray probe. A nanospray probe/ emitter may be built by heating and pulling a glass capillary (0.86 mm ID) to a small tip (ca 5 μm) and may be approximately 5 cm long, resulting in a hollow glass capillary.

In certain embodiments, the mass spectrometry probe additionally includes a liquid solvent disposed within the unitary hollow body. In an exemplary embodiment, the emitter is loaded with ca 6 μL of de-ionized water. Next, 8 μL of analyte solution is injected into the front of the capillary (near the spray tip). In such embodiments, the electrically conductive hollow body is positioned within the liquid sample and solvent and the electrode is positioned at a proximal location in the hollow body such that there is an air gap between the electrode and the liquid sample, i.e., the electrode is not in contact with the liquid sample and solvent in the hollow body. The electrode and hollow conduit inductively charge the liquid sample and solvent.

Other aspects of the invention provide methods for analyzing a sample. The methods may involve providing a mass spectrometry probe comprising: a hollow body comprising a distal tip; a power source; a reservoir; an electrically conductive hollow conduit operably coupled to the reservoir and the power source, wherein the hollow conduit is configured to a transport a liquid sample into the hollow body and polarize the liquid sample as it flows through the hollow conduit and into in the hollow body; and an electrode, wherein the electrode and the hollow conduit are disposed within the hollow body. The methods may then involve introducing a liquid sample comprising a target analyte and a plurality of liquid-phase ions from the reservoir and into the hollow body via the hollow conduit. The methods may then involve applying a voltage to the hollow conduit while transporting the liquid sample from the reservoir through the hollow conduit and into the hollow body and inductively applying voltage from the electrode to the liquid sample, thereby causing the plurality of liquid-phase ions to separate from the target analyte. The methods may then involve terminating the voltage from the electrode while maintaining the voltage to the hollow conduit to thereby cause the target analyte to be emitted from the distal tip and become ionized, and analyzing the ionized target analyte in a mass spectrometer.

Figure 7A:
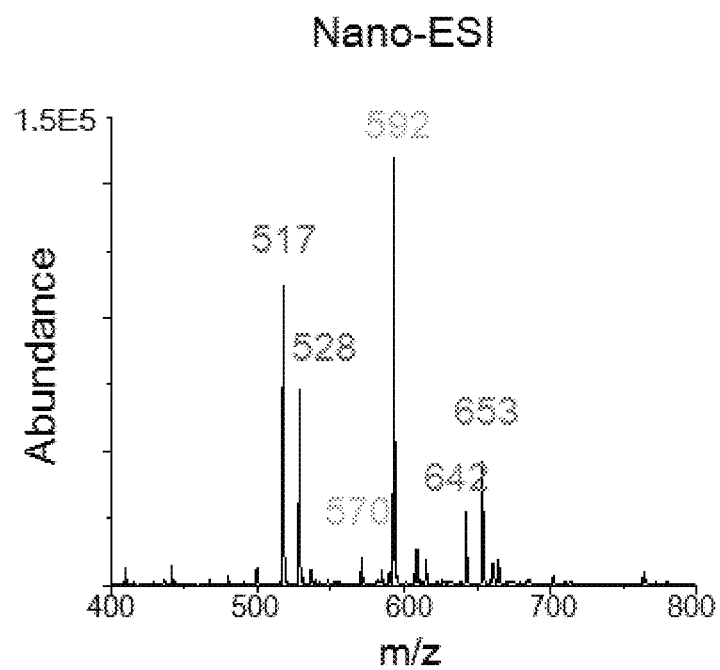
Figure 7B:
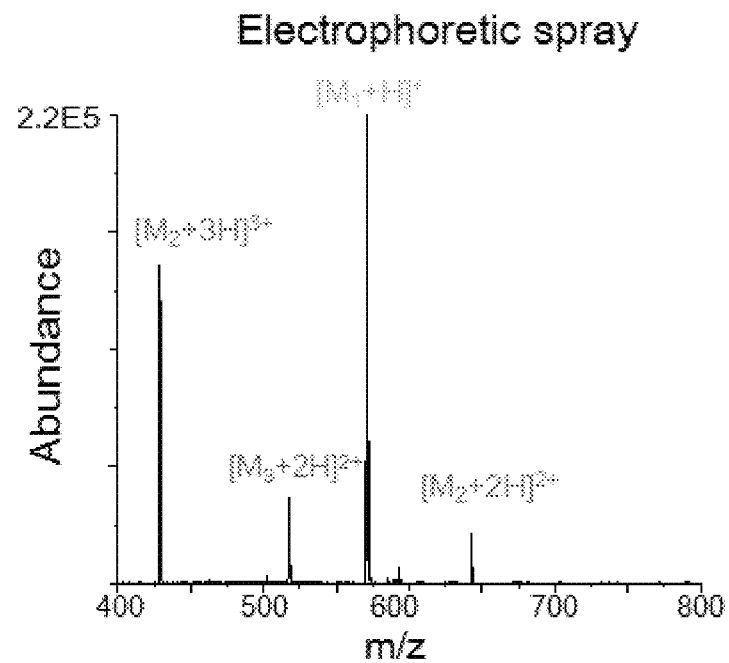

In certain embodiments, the methods may also involve introducing a solvent to the hollow body prior to introducing the liquid sample to the hollow body. In certain embodiments, applying voltage from the electrode causes the plurality of liquid-phase ions to migrate toward the electrode. In other embodiments, prior to applying voltage to the electrode, the method further involves applying voltage to only the electrically conductive hollow conduit, which imparts an electric charge to the liquid sample.

The probes, systems, and methods of the invention can be used to analyze numerous types of samples, such as biological samples, environmental samples, industrial samples etc.

BRIEF DESCRIPTION OF THE DRAWINGS

FIG. 1 is a schematic of the setup used in electrophoretic spray experiments: solvent ($H_2O$) is first loaded into the nano-ESI emitter (blue) and sample (red) in the syringe is loaded into the solvent via the injection tube. Spray voltage HV1 is applied to the needle of the syringe and separation voltage HV2 is applied to a coated electrode, which is inserted into the nano-ESI emitter such that it approaches but does not touch the liquid surface.

FIG. 2A shows traditional nano-ESI mass spectra recorded at 1.5 kV and averaged for 1 min for 5 μg/ml bradykinin (a small peptide) in 104 μg/mL aqueous NaCl. FIG. 2B is as in FIG. 2A but using 0.5 μg/mL bradykinin. FIG. 2C as in FIG. 2A but with 0.1% formic acid. FIG. 2D as in FIG. 2B but with 0.1% formic acid. FIG. 2E is electrophoretic spray of the same solution as in FIG. 2A and same spray voltage (HV1) of 1.5 kV after application for 1 min and removal of −5 kV separation voltage (HV2). FIG. 2F is electrophoretic spray of the same solution as in FIG. 2B with spray voltage (HV1) of 1.5 kV and after application for 1 min and removal of −5 kV separation voltage (HV2). Ion abundances are given in instrument counts.

FIG. 3A is a total ion chronogram and average electrophoretic spray mass spectra during multiple cycles of desalination. FIG. 3B is an average mass spectrum recorded during 5-15 min of the first cycle, showing only protonated peptide. FIG. 3C is an average mass spectrum recorded during 18-22 min showing appearance of $Na^+$ and $K^+$ adducts. FIG. 3D is an average mass spectrum recording during 45-55 min, showing removal of $Na^+$ and $K^+$ adducts by the third cycle of cleaning. Separation voltage HV2 was turned on for 10 seconds at the beginning of each cycle. The three dashed lines indicate the time at which the $Na^+$ and $K^+$ adducts reappear in the spectra. Sample: 1 μg/mL carfilzomib (a small molecule therapeutic) in 10 μg/mL NaCl and 20 μg/mL KCl.

FIGS. 4A-D are mass spectra in negative ion mode for 1 μg/mL carfilzomib M=719.91 in 15 μg/mL NaCl, 15 μg/mL $CaCl_2$ and 60 μg/mL $(CH_3)_4NBr$. FIG. 4A shows traditional nano-ESI mass spectrum recorded at −1.5 kV with averaging for 1 min. FIG. 4B is as in FIG. 4A but showing low mass range. FIG. 4C shows electrophoretic spray of the same solution as in FIG. 4A but with spray voltage (HV1) of −1.5 kV and after application for 1 min then removal of 5 kV separation voltage (HV2). FIG. 4D is as in FIG. 4B but showing low mass range. Ion abundances are given in instrument counts.

FIG. 5A shows traditional nano-ESI mass spectrum recorded at 1.5 kV and averaged for 1 min for 50 μg/mL Cytochrome C. FIG. 5B shows electrophoretic spray of the same solution as in FIG. 5A but with spray voltage (HV1) of 1.5 kV and after application for 1 min and then removal of −4 kV separation voltage (HV2). FIG. 5C shows electrophoretic spray of the same solution as in FIG. 5A but with spray voltage (HV1) of 1.5 kV and after application for 1 min and then removal of −5 kV separation voltage (HV2). Ion abundances are given in instrument counts.

FIGS. 6A-D show four stages of electrophoretic spray for 1 μg/ml carfilzomib in 10 g/mL NaCl and 20 μg/mL. Spray voltage HV1 was 1.5 kV, separation voltage HV2 was turned on for 1 min at start of stage 3 and then removed. FIG. 6A shows average mass spectrum recorded during the first stage, 0 min-1 min, showing only background peaks from solvent. FIG. 6B shows stage 2: 1 min-2 min mass spectrum showing appearance of all the analytes and matrix peaks. In stage 3, separation voltage was applied again but no signal could be observed in positive ion mode. FIG. 6C shows stage 4: 4 min-6 min protonated ion seen and gradually increased after removal of HV2. FIG. 6D shows stage 5: average mass spectrum recorded during period 6 min-60 min showing the protonated molecule as the base peak, the mass spectra was stable and free of salt cationic adducts.

FIG. 7A shows traditional nano-ESI mass spectrum recorded at 1.5 kV and averaged for 2 min for peptide mixture ($M_1$:[D-Ala$^2$]-Leucine encephalin 10 μg/mL; $M_2$: (Val$^5$)-angiotensin I (a small peptide hormone) 10 μg/mL and M3: bradykinin 5 µg/mL). FIG. 7B shows electrophoretic spray of the same solution as in FIG. 7A also with spray voltage (HV1) of 1.5 kV but after application for 1 min and then removal of −5 kV separation voltage (HV2). Ion abundances are given in instrument counts. [D-Ala$^2$]-Leucine encephalin: m/z 570, $[M_1+H]^+$; m/z 592, $[M_1+Na]^+$; (Val$^5$)-angiotensin I: m/z 642, $[M_2+2H]^{2+}$, m/z 653, $[M_2+2Na]^{2+}$; Bradykinin: m/z 517, $[M_3+2H]^{2+}$; m/z 528, $[M_3+2Na]^{2+}$.

Figure 8A:
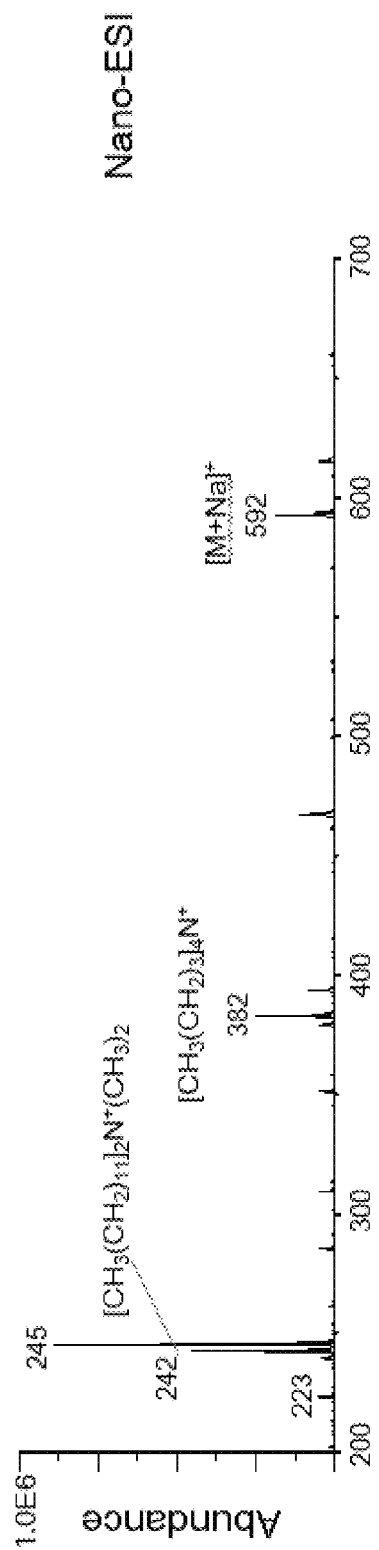
Figure 8B:
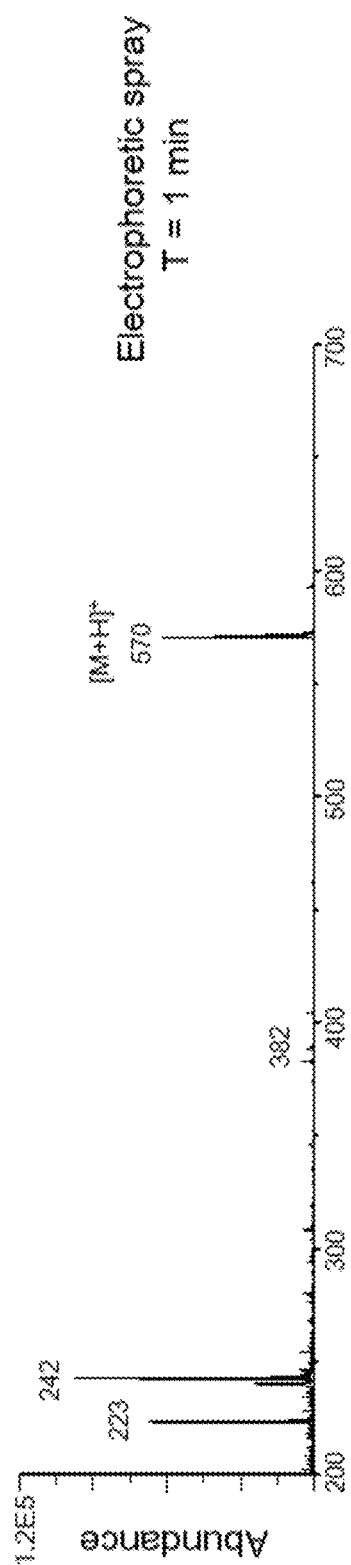
Figure 8C:
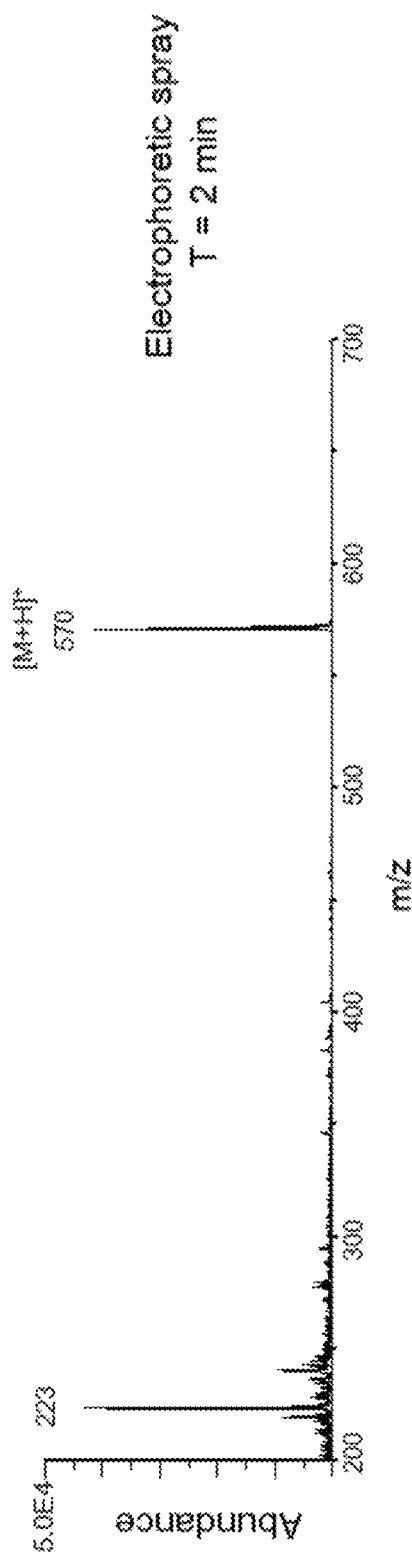

FIG. 8A shows traditional nano-ESI mass spectra recorded at 1.5 kV and averaged for 2 min. FIG. 8B shows electrophoretic spray of the same solution as in FIG. 8A with spray voltage (HV1) of 1.5 kV but after application for 1 min and removal of −5 kV separation voltage (HV2), showing the ability to remove inorganic salts. FIG. 8C shows electrophoretic spray of the same solution as in FIG. 8A with spray voltage (HV1) of 1.5 kV but after application for 2 min of −5 kV separation voltage (HV2), showing the ability of remove organic salts. Sample: Didodecyldimethyl ammonium bromide 1 µg/mL, Tetra-n-butyl ammonium iodide 1 µg/mL, [D-Ala$^2$]-Leucine encephalin 5 µg/mL. Unknown compound MW 222 Da, contributes to background, m/z 223, 245.

Figure 9A:
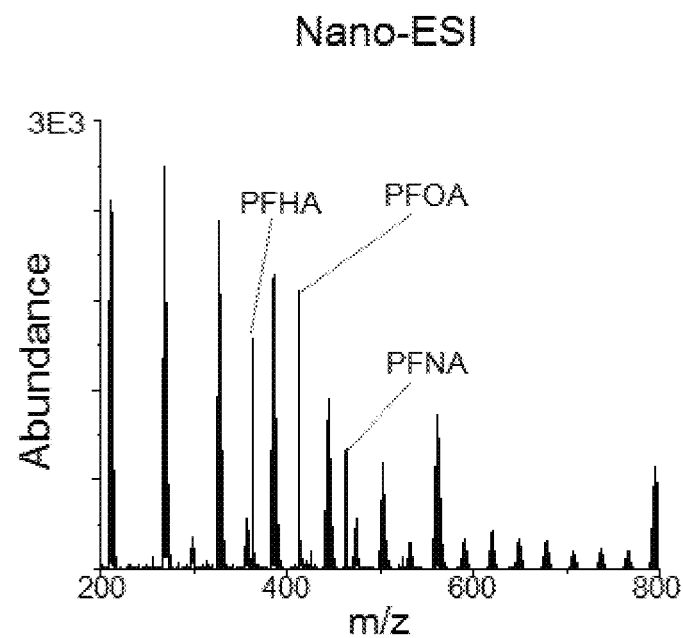
Figure 9B:
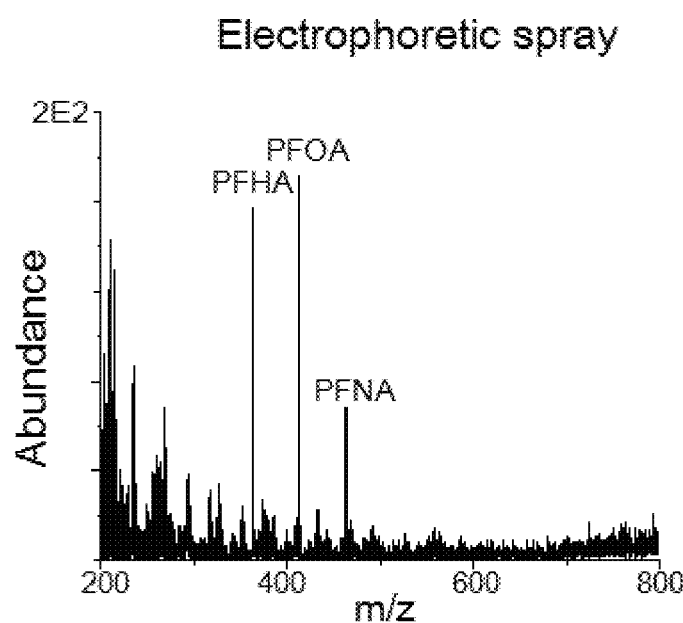

FIG. 9A shows traditional nano-ESI mass spectra recorded at −2 kV and averaged for 1 min. FIG. 9B shows electrophoretic spray of the same solution as in FIG. 9A with spray voltage (HV1) of −2 kV but after application for 1 min and removal of 6 kV separation voltage (HV2). Ion abundances are given in instrument counts. Sample mixture: perfluoroheptanoic acid (PFHA) 1 µg/mL, perfluorooctanoic acid (PFOA) 1 µg/mL, perfluorononanoic acid (PFNA) 1 µg/mL in 104 µg/mL aqueous NaCl.

Figure 10A:
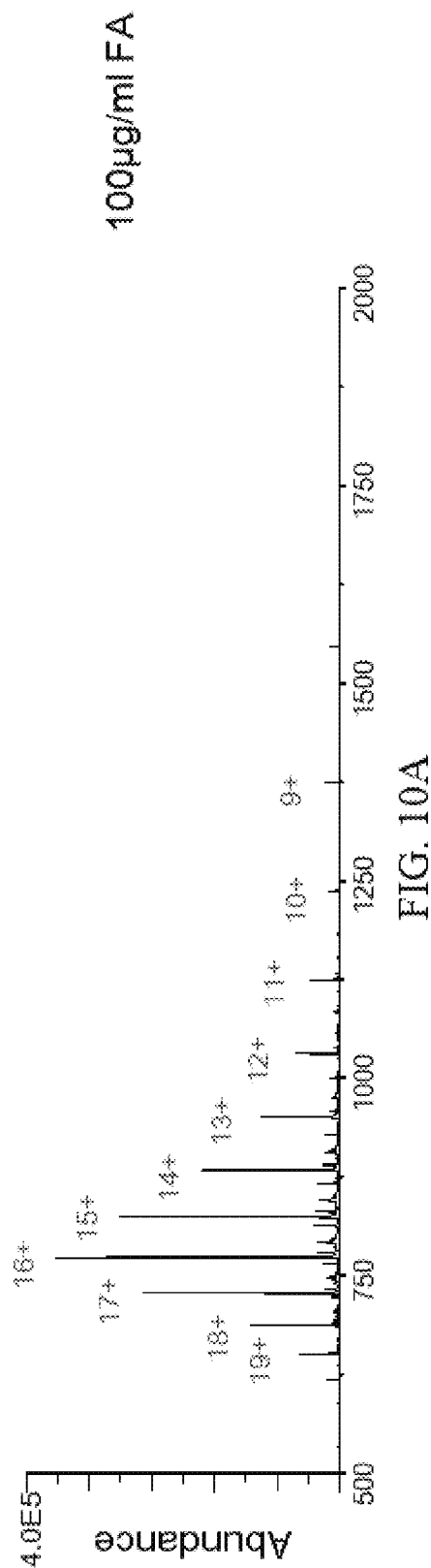
Figure 10B:
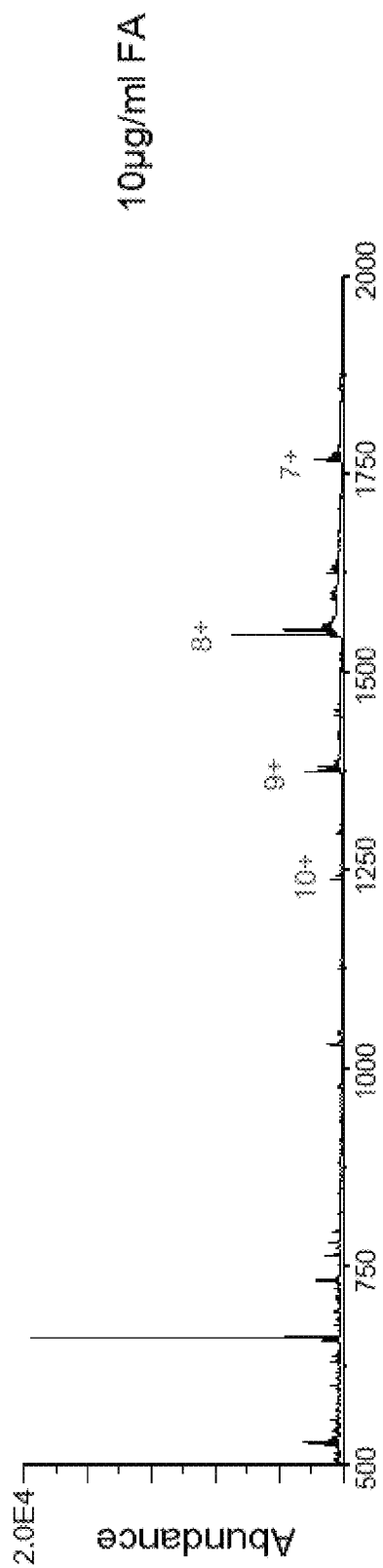
Figure 10C:
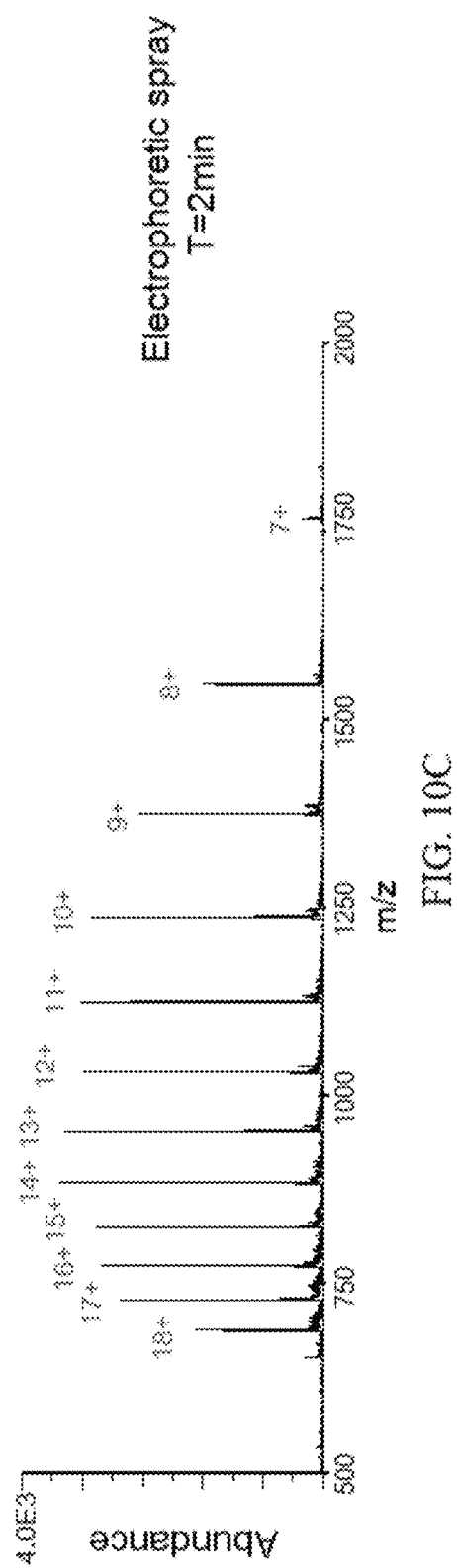

FIG. 10A shows traditional nano-ESI mass spectra recorded at 1.5 kV and averaged for 1 min for 50 µg/mL cytochrome C (a small hemeprotein) with addition of 100 µg/mL formic acid. FIG. 10B is as in FIG. 10A with 10 µg/mL formic acid. FIG. 10C shows electrophoretic spray of 50 µg/mL cytochrome C with spray voltage (HV1) of 1.5 kV and after application for 1 min and removal of −5 kV separation voltage (HV2). Ion abundances are given in instrument counts.

Figure 11A:
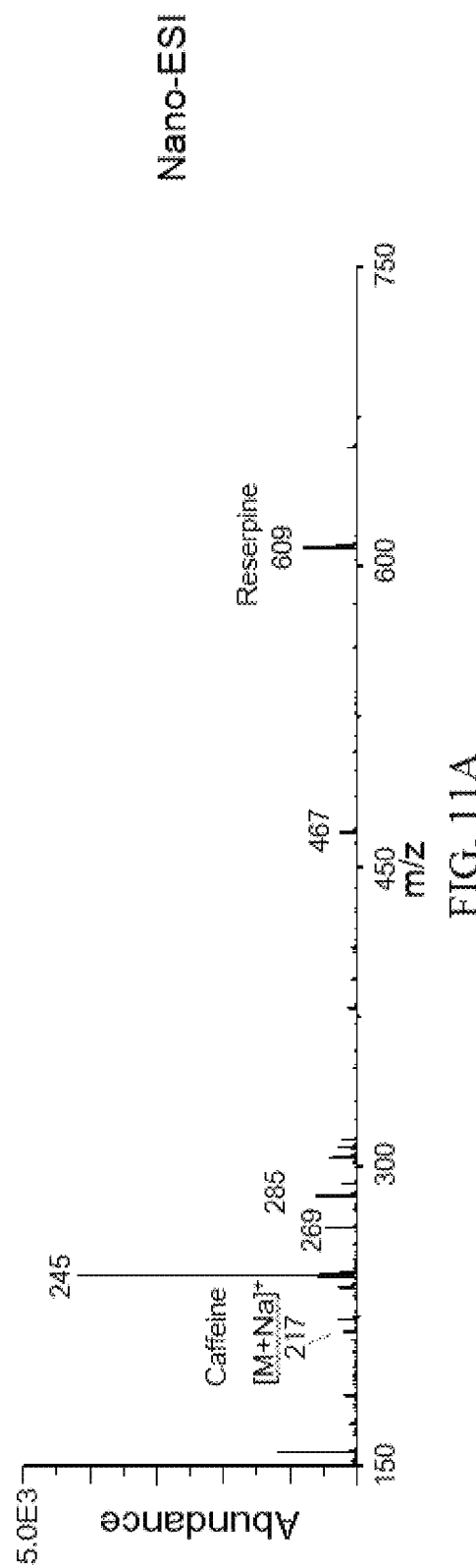
Figure 11B:
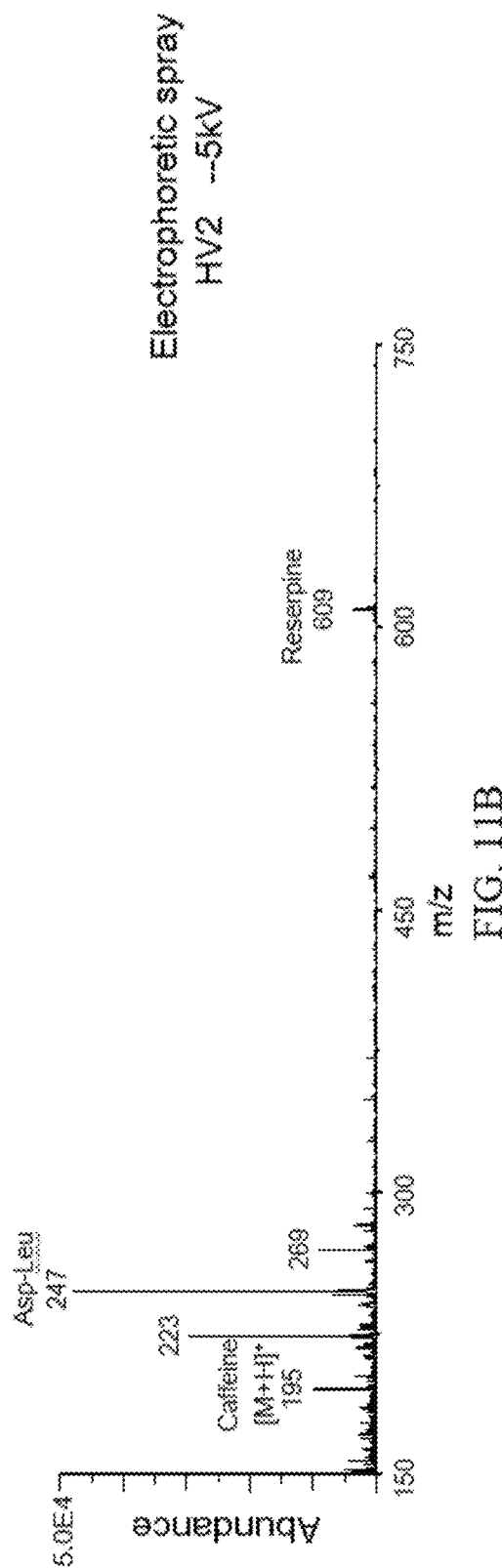

FIG. 11A shows traditional nano-ESI mass spectra recorded at 1.5 kV and averaged for 1 min for 5 µg/mL caffeine, 20 µg/mL Asp-Leu and 1 µg/mL reserpine in 50 µg/mL aqueous NaCl. FIG. 11B shows electrophoretic spray of the same sample as FIG. 11A with spray voltage (HV1) of 1.5 kV and after application for 1 min and removal of −5 kV separation voltage (HV2). Ion abundances are given in instrument counts. Unknown compound MW 222 Da, contributes to background, m/z 223, 245.

Figure 12A:
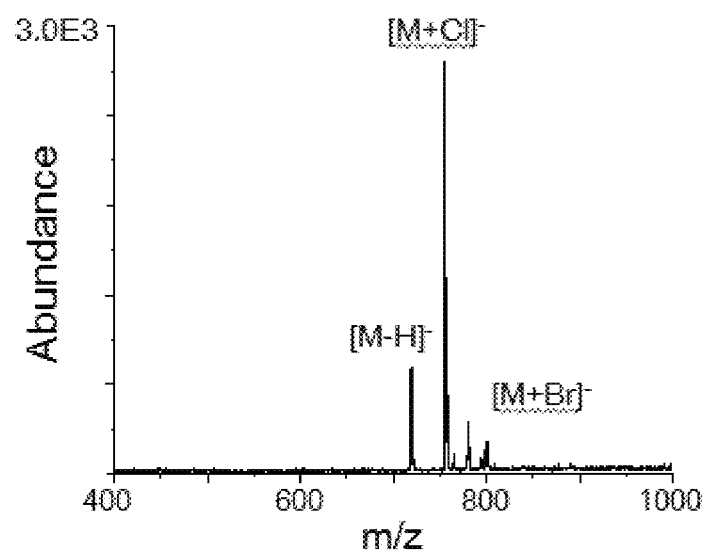
Figure 12B:
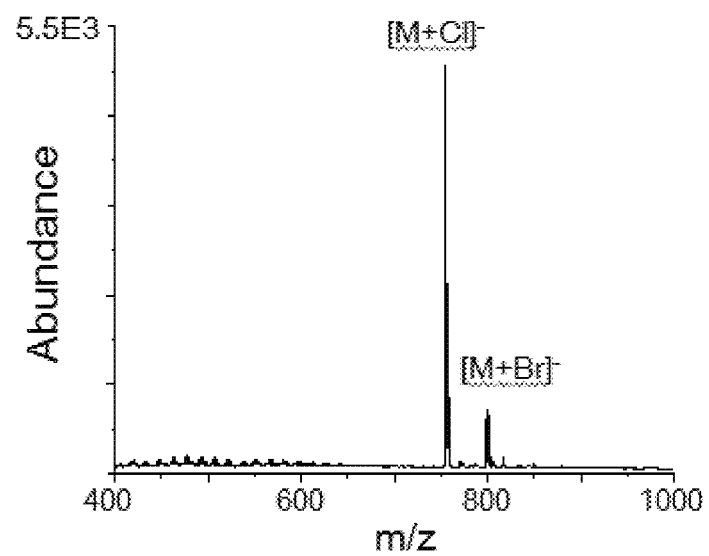

FIGS. 12A-B show electrophoretic spray mass spectra recorded after application of positive separation voltage with detection in the negative ion mode. FIG. 12A: Spray voltage (HV1) of 1.5 kV after application of −1 kV separation voltage (HV2). FIG. 12B: Spray voltage (HV1) 1.5 kV with application of −5 kV separation voltage (HV2). Sample: 1 µg/mL carfilzomib with 15 µg/mL NaCl, 15 µg/mL CaCl$_2$ and 60 µg/mL (CH$_3$)$_4$NBr.

Figure 13A:
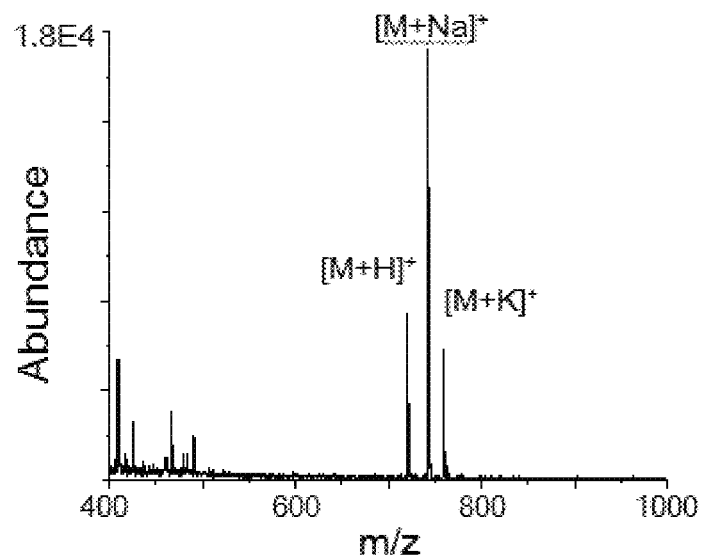
Figure 13B:
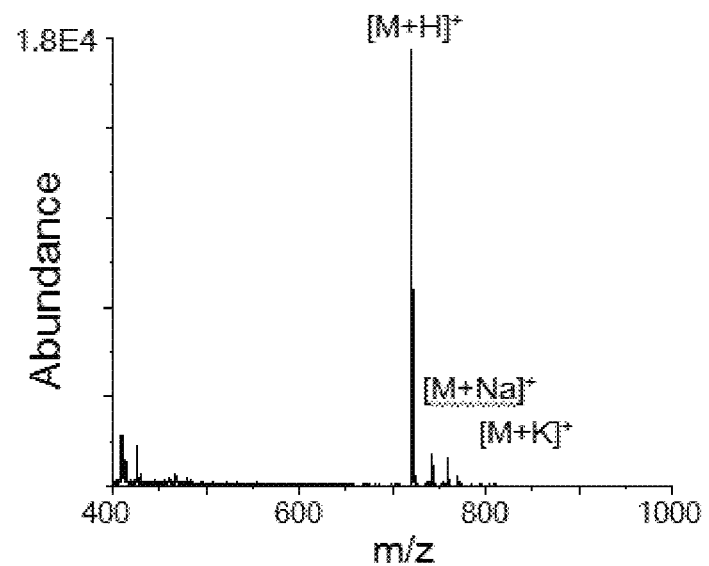

FIGS. 13A-B show electrophoretic spray mass spectra recorded after application of negative ion separation voltage but with positive ion detection. FIG. 13A: spray voltage (HV1) of −1.5 kV and application of 1 kV separation voltage (HV2). FIG. 13B: −1.5 kV spray voltage HV1 and with application of +5 kV separation voltage (HV2). Sample: 1 µg/mL carfilzomib with 15 µg/mL NaCl, 15 µg/mL CaCl$_2$ and 60 µg/mL (CH$_3$)$_4$NBr.

Figure 14A:
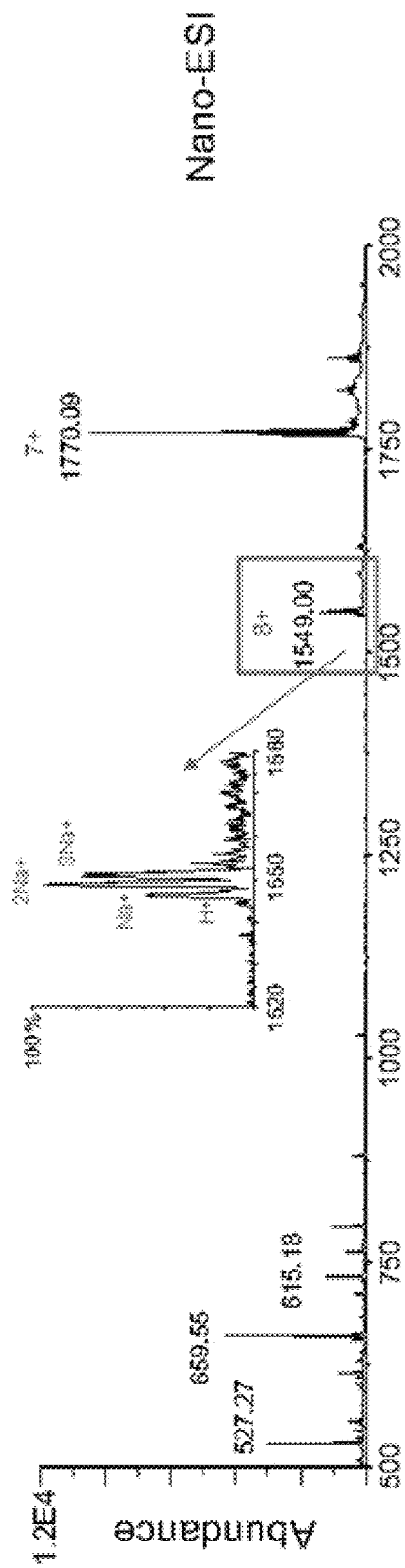
Figure 14B:
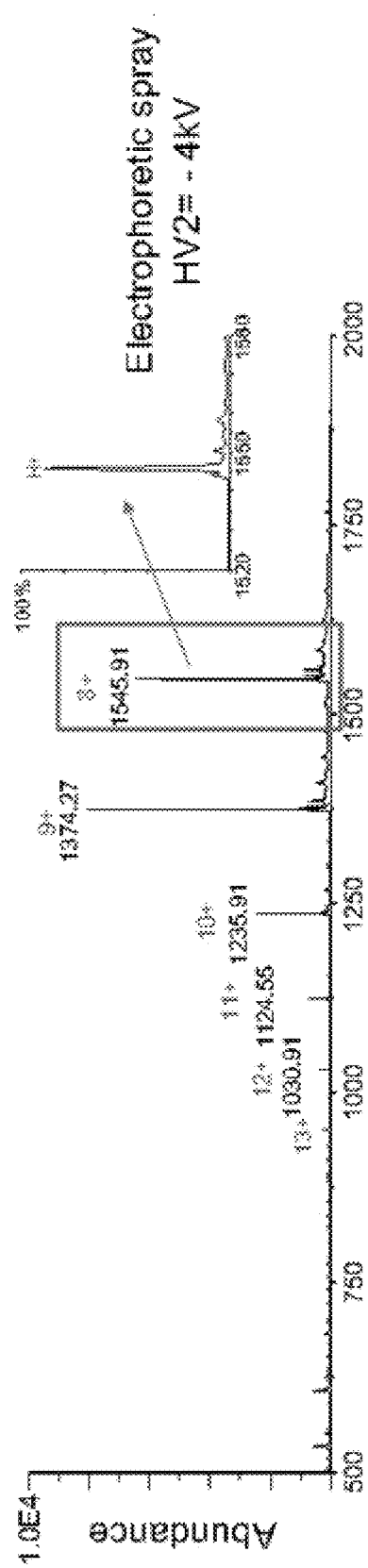
Figure 14C:
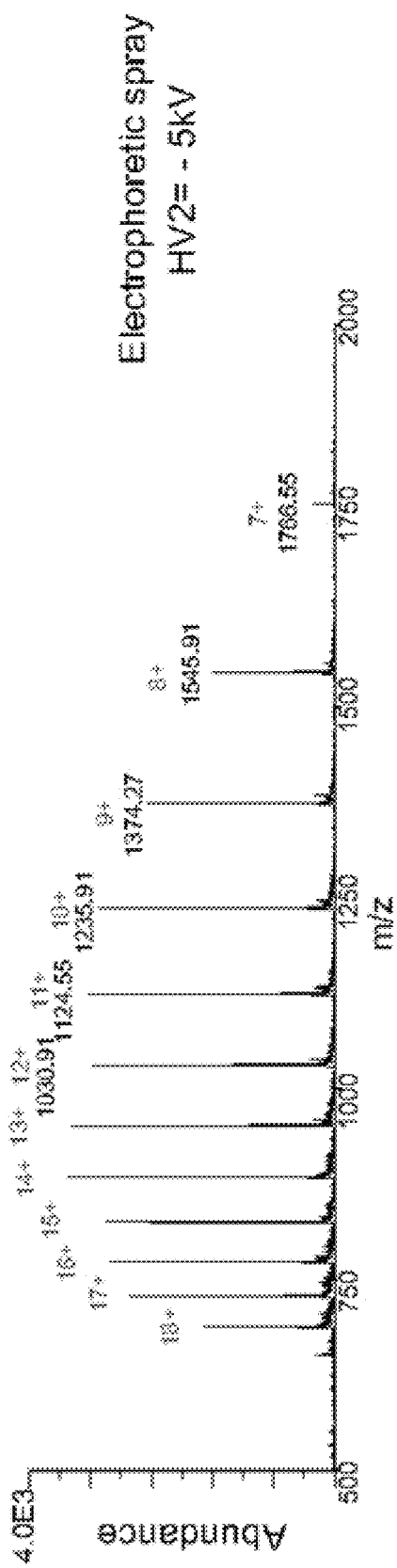

FIG. 14A shows nano-ESI mass spectrum recorded at 1.5 kV and averaged for 1 min for 50 µg/mL Cytochrome C; FIG. 14B shows electrophoretic spray of the same solution as in FIG. 14A but with spray voltage (HV1) of 1.5 kV and after application for 1 min and then removal of −4 kV separation voltage (HV2); FIG. 14C shows electrophoretic spray of the same solution as in FIG. 14A but with spray voltage (HV1) of 1.5 kV and after application for 1 min and then removal of −5 kV separation voltage (HV2). Ion abundances are given in instrument counts. Illustration are amplified mass spectrum of the 8+ charged peak.

Figure 15A:
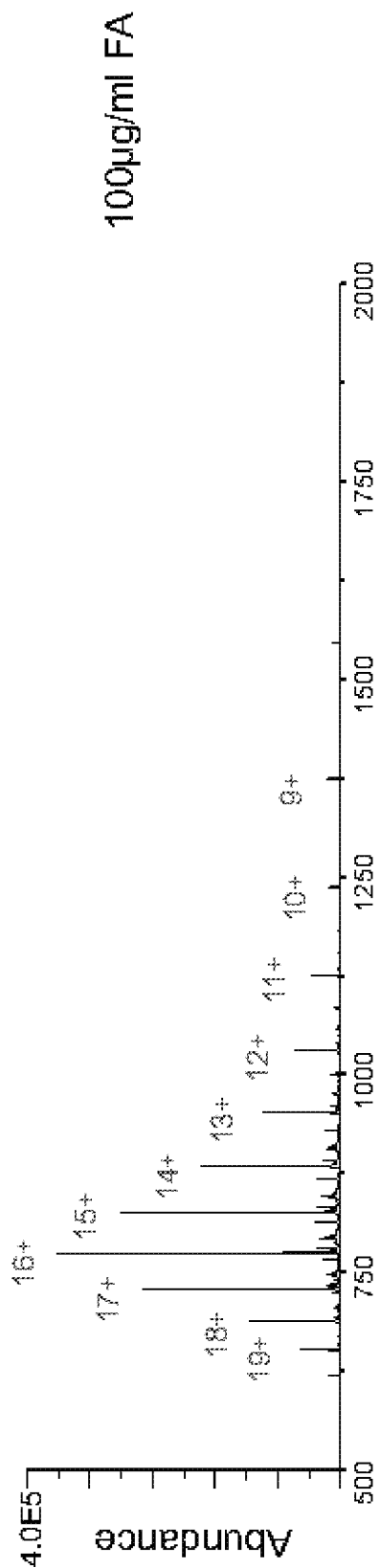
Figure 15B:
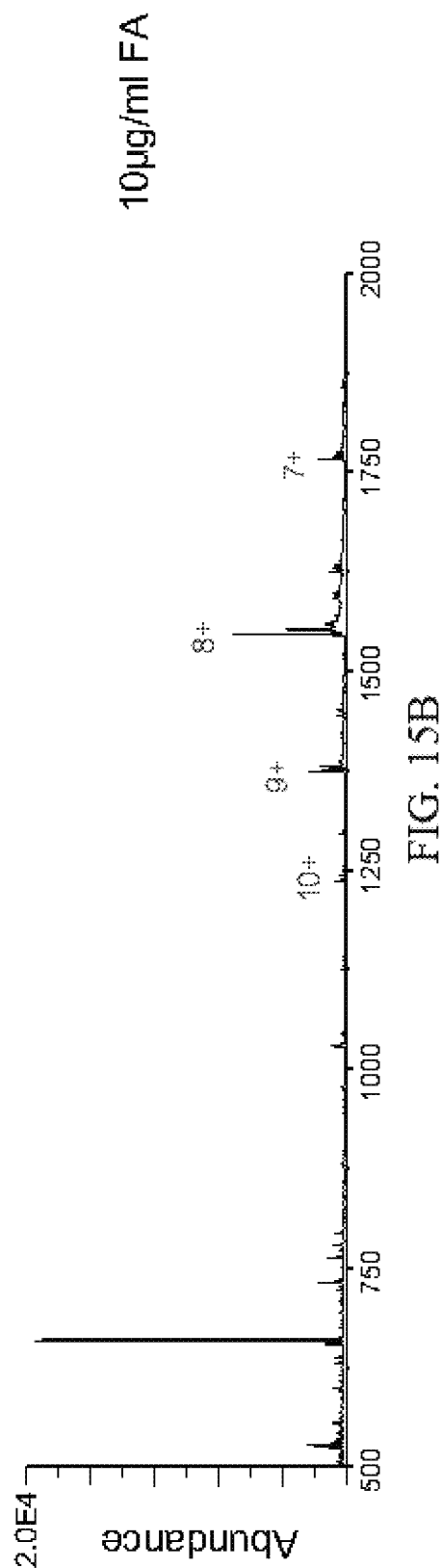
Figure 15C:
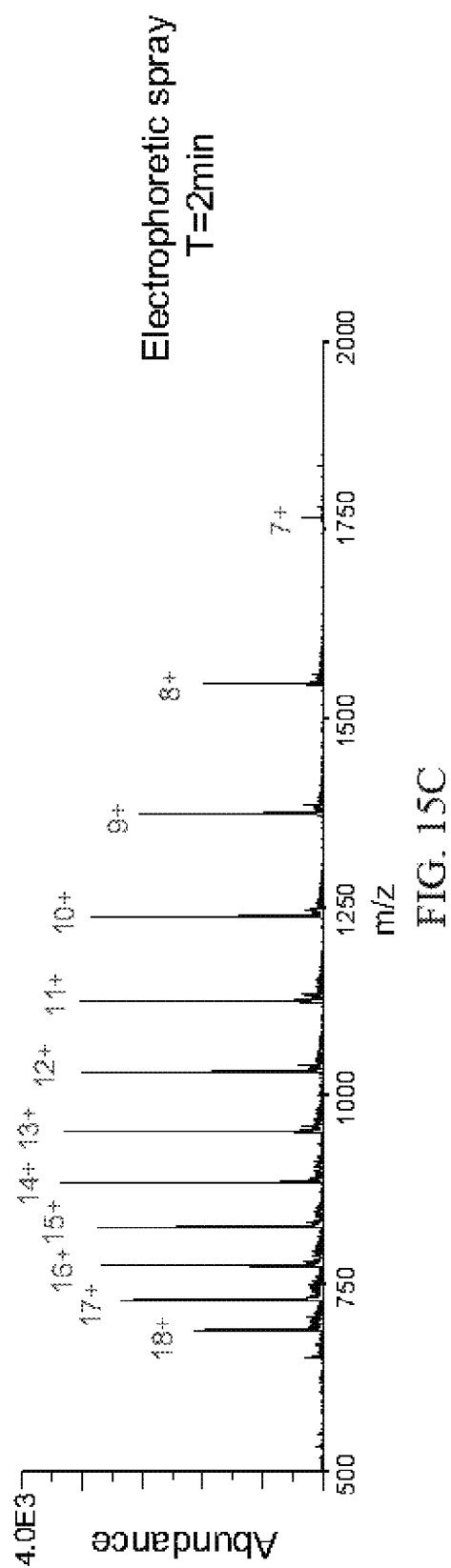

FIG. 15A shows nano-ESI mass spectrum recorded at 1.5 kV and averaged for 1 min for 50 µg/mL cytochrome C with addition of 100 µg/mL formic acid; FIG. 15B shows the same configuration as in FIG. 15A except with 10 µg/mL formic acid; FIG. 15C shows electrophoretic spray mass spectrum of 50 µg/mL cytochrome C with spray voltage (HV1) of 1.5 kV and a 2 mins–5 kV separation voltage (HV2) recorded after removal of HV2. Ion abundances are given in instrument counts.

Figure 16A:
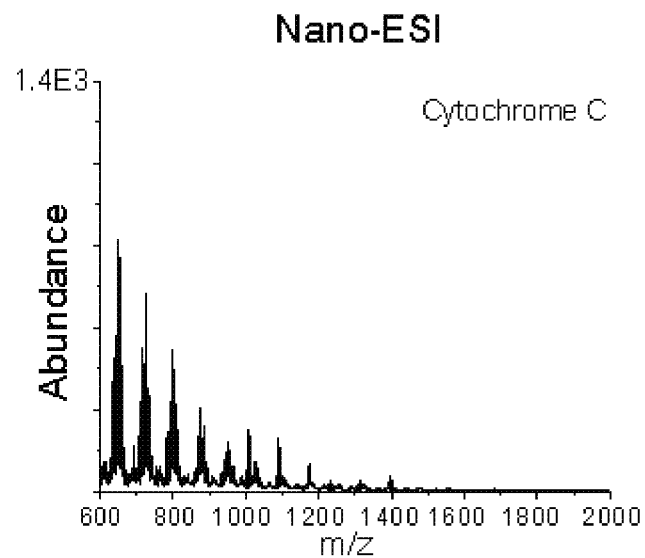
Figure 16B:
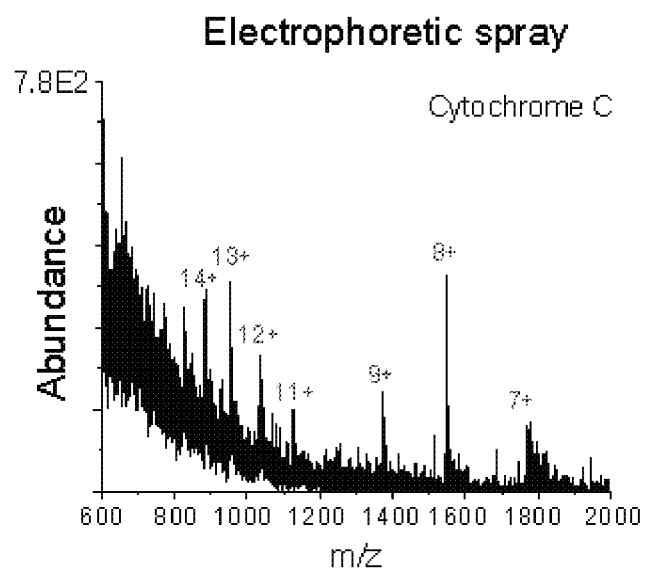
Figure 16C:
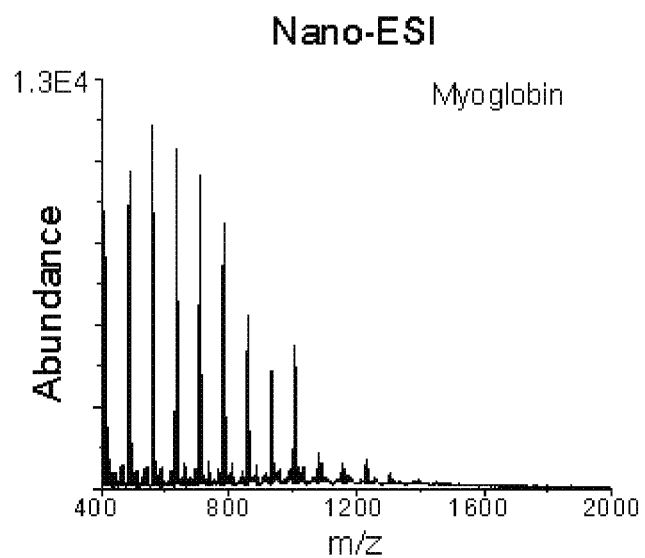
Figure 16D:
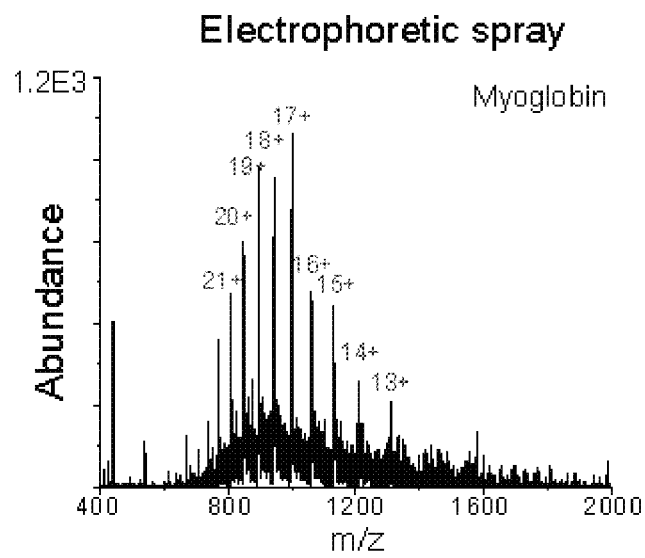

FIG. 16A shows nano-ESI mass spectrum recorded at 1.5 kV and averaged for 30 seconds for 5 µM Cytochrome C in 150 mM KCl and 25 mM Tris-HCl buffer showing only salt and buffer cluster ions; FIG. 16B shows electrophoretic spray mass spectrum of the same solution as in FIG. 16A and 2 min–5 kV separation voltage (HV2) recorded after HV2 removal. FIG. 16B shows nano-ESI mass spectrum recorded at 1.5 kV and averaged for 30 seconds for 5 M Myoglobin in 150 mM KCl and 25 mM Tris-HCl buffer showing only salt and buffer cluster ions; FIG. 16D shows electrophoretic spray mass spectrum of the same solution as in FIG. 16C and 2 min–5 kV separation voltage (HV2) recorded after HV2 removal and showing the characteristic myoglobin charge state distribution.

Figure 17A:
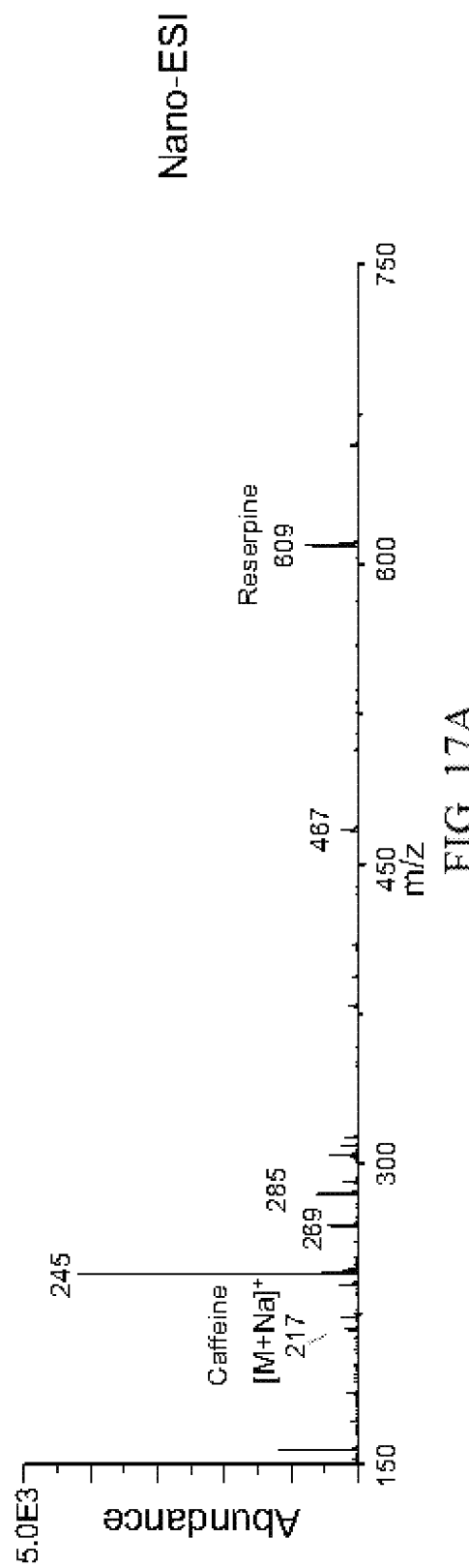
Figure 17B:
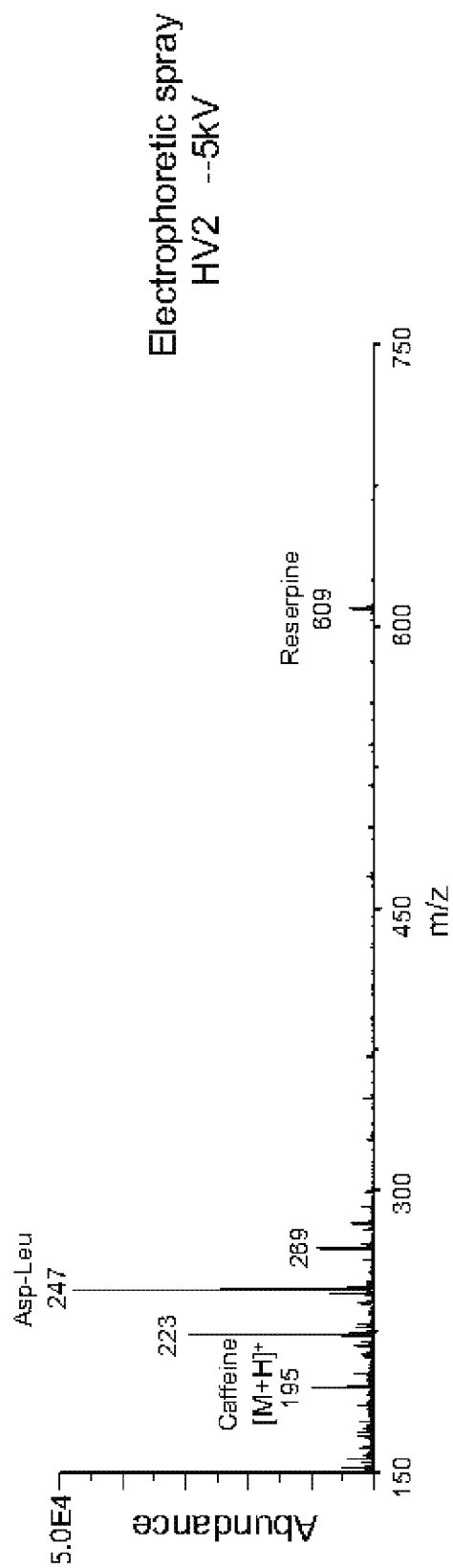

FIG. 17A shows nano-ESI mass spectrum recorded at 1.5 kV and averaged for 1 min for 5 µg/mL caffeine, 20 µg/mL Asp-Leu and 1 µg/mL reserpine in 50 µg/mL aqueous NaCl; FIG. 17B shows electrophoretic spray mass spectrum of the same sample as in FIG. 17A with a spray voltage (HV1) of 1.5 kV and a 1 min-5 kV separation voltage (HV2) recorded after HV2 removal. Ion abundances are given in instrument counts. Unknown compound MW 222 Da, contributes to background, m/z 223, 245.

Figure 18A:
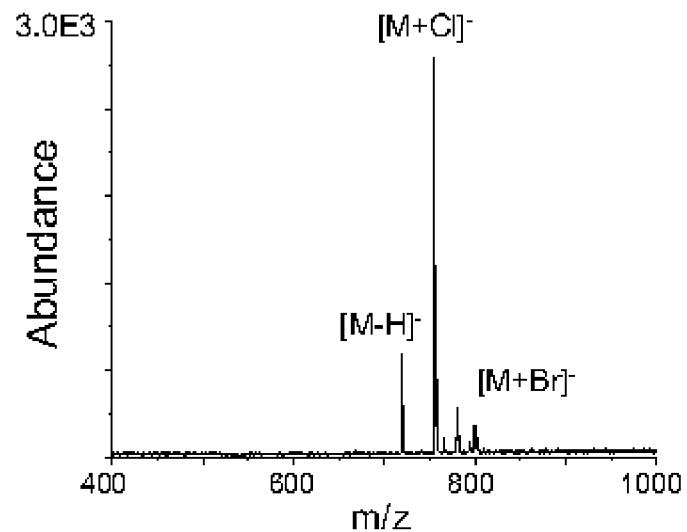
Figure 18B:
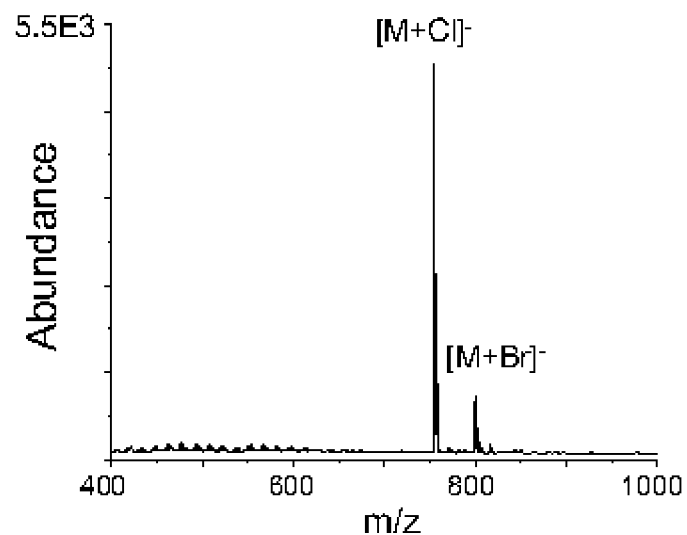

FIGS. 18A-B show electrophoretic spray mass spectra recorded after application of positive separation voltage with detection in the negative ion mode. FIG. 18A: Spray voltage (HV1) of 1.5 kV with application of −1 kV separation voltage (HV2); FIG. 18B: Spray voltage (HV1) of 1.5 kV with application of −5 kV separation voltage (HV2). Sample: 1 µg/mL carfilzomib with 15 µg/mL NaCl, 15 µg/mL CaCl$_2$ and 60 µg/mL (CH$_3$)$_4$NBr.

Figure 19A:
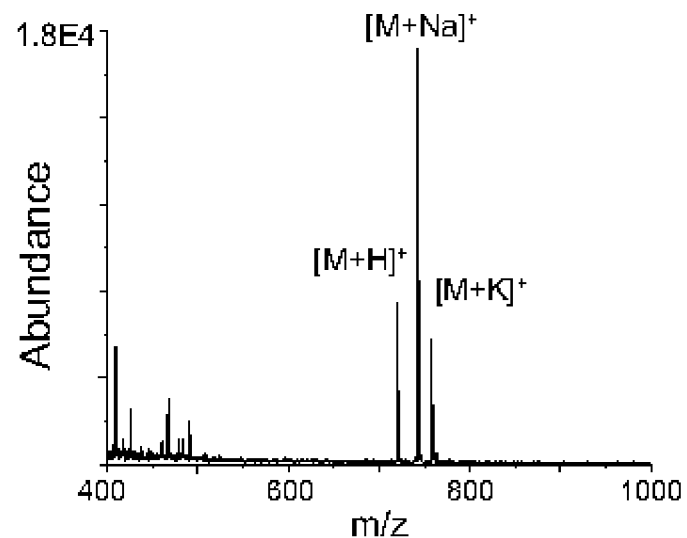
Figure 19B:
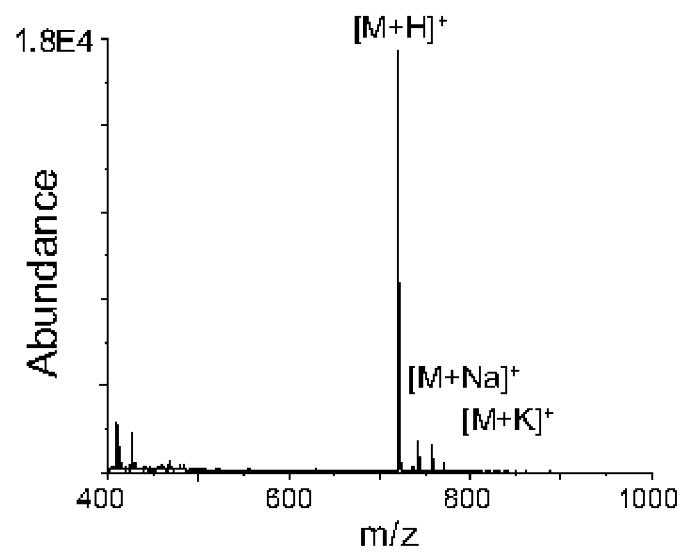

FIGS. 19A-B show electrophoretic spray mass spectra recorded after application of negative ion separation voltage but with positive ion detection. FIG. 19A: Spray voltage (HV1) of −1.5 kV with application of 1 kV separation voltage (HV2); FIG. 1BA: Spray voltage (HV1) of −1.5 kV with application of +5 kV separation voltage (HV2). Sample: 1 µg/mL carfilzomib with 15 µg/mL NaCl, 15 µg/mL CaCl$_2$ and 60 µg/mL (CH$_3$)$_4$NBr.

Figure 20:
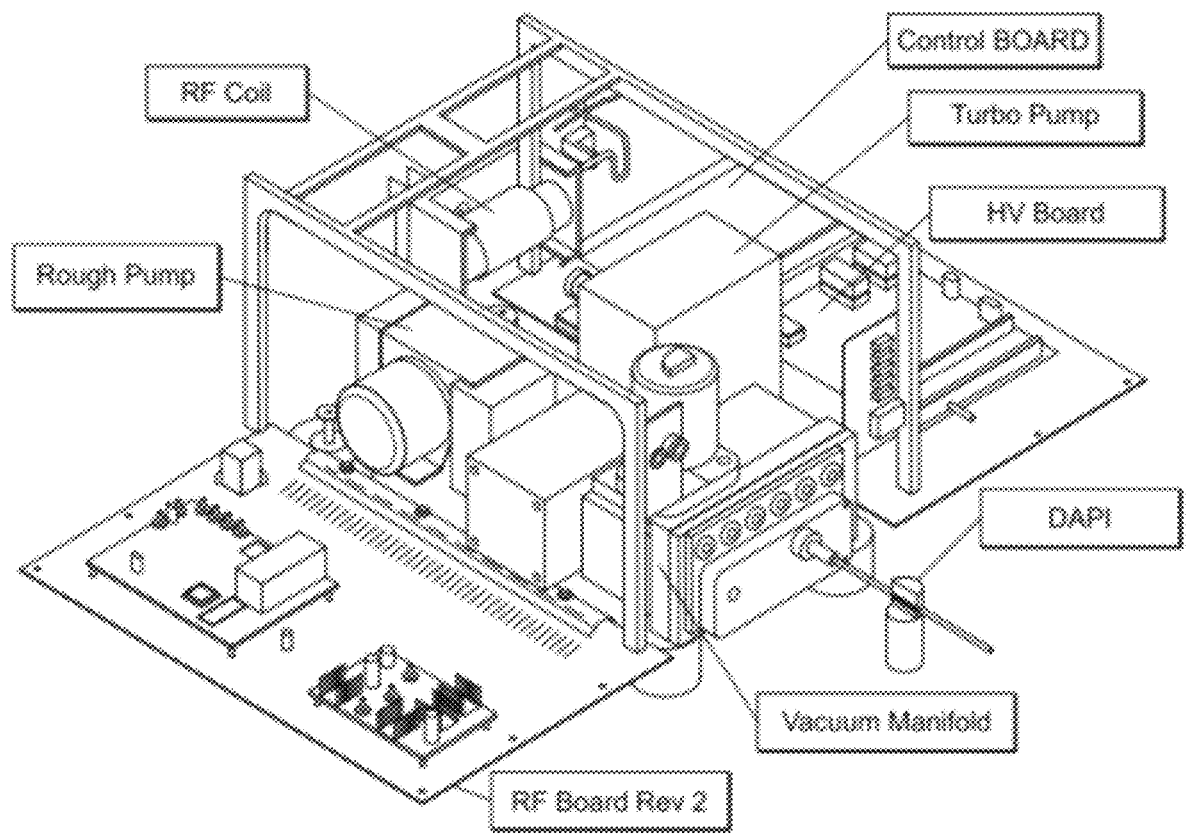

FIG. 20 is a picture illustrating various components and their arrangement in a miniature mass spectrometer.

DETAILED DESCRIPTION

Biological samples often exist in complex matrices and despite the performance merits of mass spectrometers (MS), these instruments are vulnerable to the deleterious effects of solution phase ions such as inorganic salts and other precharged species, many of which are used as buffers. These components can suppress analyte signal and cause a single ion to be split across multiple signal channels (e.g. $M+H^+$, $M+Na^+$ and $M+K^+$) lowering sensitivity and complicating the spectrum. This is especially true for high salinity matrices.

Off-line desalting methods such as solid phase extraction and gel-filtering techniques have been developed to remove some of these interferents from the matrix and to modify the buffer. This approach exchanges non-volatile buffer matrix with highly volatile MS compatible buffer such as ammonium acetate. This method can be performed on-line and off-line but requires the sample to be stable enough to survive the matrix change. Size exclusion chromatography (SEC) can be used as an effective alternative to aid in desalting chemical matrices. On-line variants of this method incorporate gel filtration cartridges into the SEC to reduce sample consumption while also maximizing the desalting effect. Numerous commercial and research liquid chromatographic (LC) methods have also been developed to desalt matrices for protein analysis by MS.

The invention probes an electrophoretic, multi-electrode mass spectrometry probe (e.g., a nano-ESI probe) that operates to rapidly desalt matrices without the addition of any chemical modifiers. The setup, shown in FIG. 1, is a small capillary which contains ca 6 µL of water (blue). The analyte, shown in purple, is delivered to the tip of the capillary, optionally via a syringe pump (e.g., sample reservoir), connected to an insulated fused silica line (e.g., electrically conductive hollow conduit) for two minutes (4 µL/min). A high voltage connector, HV1, which delivers 1.5 kV to the front of the capillary through conduction of the solvent insulated line via the syringe pump. In certain embodiments, HV1 may be equivalent to a typical spray voltage in any spray based ionization source. The second electrode, HV2, is inside the glass capillary, but not in contact with the solvent (ca 5 mm air gap). As shown, HV1 and HV2 each terminate at different distances from a distal tip of the hollow capillary. In the exemplified embodiment, HV2 terminates closer to a rear of the capillary than HV1.

As shown in FIG. 1, the body of the mass spectrometry probe is a hollow unitary body. This is exemplary and not required in all embodiments. In the context of the invention, unitary refers to the fact that walls of the body of the mass spectrometry probe include no breaks, cuts, or disconnected regions. Rather, the walls of the probe run continuously from the distal tip of the probe to a rear of the probe without any breaks, cuts, or disjointed regions, as shown in FIG. 1. In that manner, the mass spectrometry probes can operate without the formation of a liquid bridge or any other connector that would be required to connect to parts of a disjointed non-unitary probe body. Similarly, the methods of the invention can be performed without the need for a liquid bridge in the probe set-up.

Without being limited to any particular theory or mechanism of action, in-source desalting typically occurs in three steps. For positive mode analysis, HV1 is set to (+)1.5 kV and the syringe pump is operated as described above. The data gathered during step 1 is a typical spectrum that contains $M+H^+$, $M+Na^+$ and $M+K^+$ species. Next, a second potential, HV2, is applied inductively to a rear of the solvent meniscus, ranging from -3 kV to -5 kV. While on, the positive ion signal is depleted due to the high negative electric field which sequesters the positive ions to the rear of the capillary. After a time period, (e.g., 1 minute (exemplary time period)), voltage from HV2 is removed (voltage is terminated) and solution-phase ions proceed to the front of the emitter; however, due to mobility, the protons reach the tip of the emitter before $Na^+$ and $K^+$ resulting in a spectrum containing primarily protonated ions.

Figure 2A:
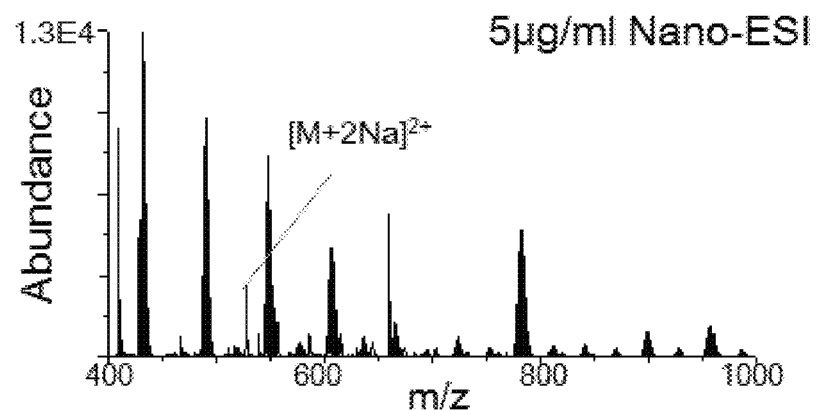
Figure 2B:
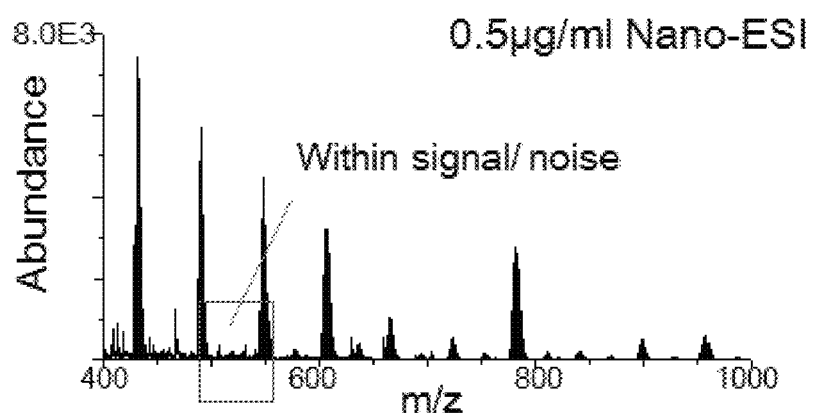
Figure 2C:
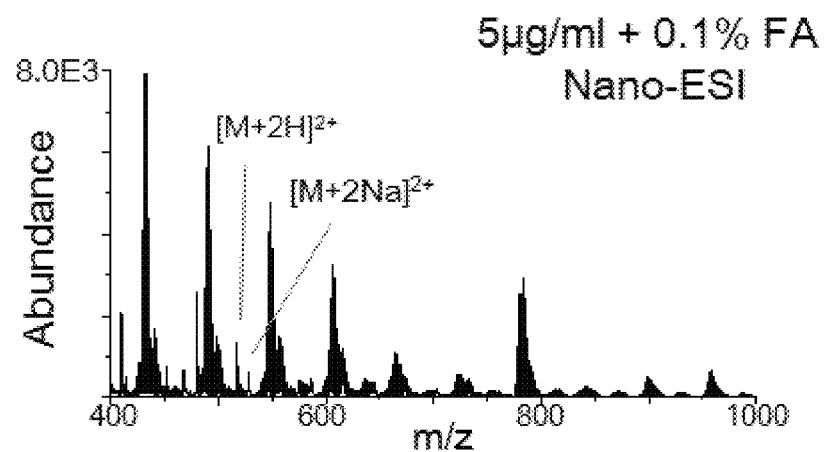
Figure 2D:
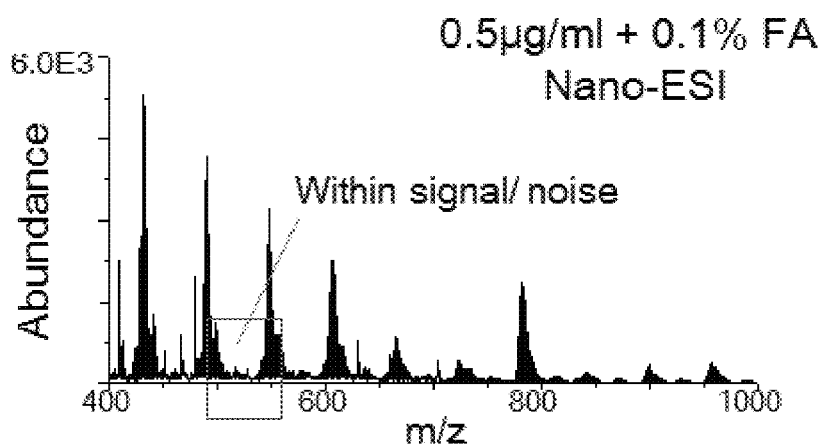

This method was applied to a bradykinin sample, prepared at 5.0 and 0.5 µg/mL in $10^4$ µg/mL of NaCl. FIGS. 2A-B illustrate the challenges of analyzing compounds in high salt matrices. Bradykinin at 5 µg/mL is barely detectable and at 0.5 µg/mL is below the LOD for the instrument. Notwithstanding, even the addition of 0.1% formic acid (FA) does not significantly improve the signal-to-noise for bradykinin (FIGS. 2C-D). These solutions were also analyzed using the electrophoretic source, FIGS. 2E-F. In both spectra, the S/N is significantly improved due to the removal of the ionic (in this case, cationic) species from the tip of the capillary. The desalting process can be repeated multiple times to further remove cationic adducts that may reappear during long analysis times. FIGS. 3A-D show the electrophoretic potential applied three times to reduce the appearance of unwanted metal adducts while maintaining the desired protonated ion.

Tables 1-2 below shows how the voltages and separation time affect the mass spectrum. Conditions were varied to determine the ideal settings that result in the highest S/N, HV1 and HV2.

The performance of the desalting is influenced by the potential between the spray voltage (HV1) and the separation voltage (HV2) and the time for which HV2 is applied. Carfilzomib (1 µg/mL spiked in 10 µg/mL NaCl and 20 µg/mL KCl) was used to demonstrate these two parameters under a range of conditions. Table 1 documents the difference in potential between HV1 and HV2 in relation to how long the mass spectrum stayed free of signals due to salts. The duration time is taken at the time that the [M+H]+ peak was the dominant peak in the mass spectrum and all the salt peaks are below the signal to noise ratio. The other important parameter is the application time of HV2. Table 2 shows how the difference in application time of HV2 influences the duration time of the desalination effect. Application for 10 seconds is already sufficient to generate the desalting effect; however, after around 10 minutes of clean mass spectra, salt peaks gradually reappear. It should be pointed out that different types and concentrations of salt will result in different duration times.

TABLE 1

Potential between HV1 and HV2

| HV1(KV) | HV2(KV) | Offset V | duration time* |
|---|---|---|---|
| +1.5 | -5 | -3.5 | more than 60 min |
| +2 | -5 | -3 | more than 30 min |
| +2 | -4 | -2 | more than 15 min |
| +1.5 | -3 | -1.5 | more than 15 min |
| +2 | -3 | -1 | not so clean; more than 3 min |
| +2 | -2 | 0 | no desalting effect |

*Duration of desalting after 1 min application then removal of HV2 as seen in absence of cationic adducts

TABLE 2

Timing on V2

| HV1(KV) | HV2(KV) | T | duration time |
|---|---|---|---|
| +1.5 | -5 | 1 min | more than 60 min |
| +1.5 | -5 | 10 sec | Around 10 min |

As the offset potential (HV1+HV2) increased from 0 to 3.5 kV the duration of the desalted spectra also increased. When HV1+HV2 was equal to zero, there was no desalination effect observed. The duration at which HV2 was applied was also observed to have a significant effect on the spectrum. When HV2 was on for 10 sec, the desalted spectrum persisted for 10 minutes before adducts began to form. In the case where HV2 was on for 60 sec, the desalted spectrum persisted for over an hour (Table 2). Unless otherwise specified, a 1 minute separation time and 3.5 kV offset voltage were used. Under these conditions, 1 μg/mL carfilzomib in 10 μg/mL of NaCl and 20 μg/mL of KCl were sprayed for over an hour with no cationic adducts (FIGS. 6A-D). A three-peptide mixture consisting of bradykinin at 5 μg/mL, (Val5)-angiotensin at 10 μg/mL and [D-Ala2]-Leucine encephalin at 10 μg/mL was successfully also sprayed for more than an hour (FIGS. 7A-B).

Interferents in MS analysis not only arise from inorganic salts but may also arise in the form pre-charged organic ions such as quaternary ammonium salts. To investigate this matter, didodecyldimethyl ammonium bromide 1 μg/mL, tetra-n-butyl ammonium iodide 1 μg/mL, and [D-Ala2]-leucine encephalin 5 μg/mL were analyzed via nESI and electrophoretic spray (FIGS. 8A-C). In the nESI spectrum, sodium adducts and interferences from the quaternary ammonium appeared in the spectrum. After a separation time of 1 min, the sodium adduct is completely removed however, the ammonium peak remained present. Nevertheless, after another 1 minute cycle, the ammonium was also removed.

Figure 4A:
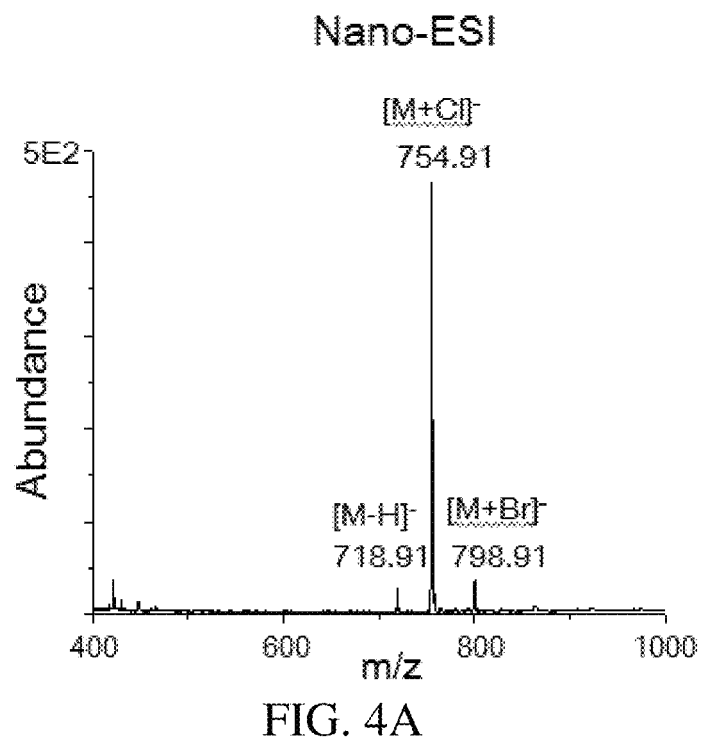
Figure 4B:
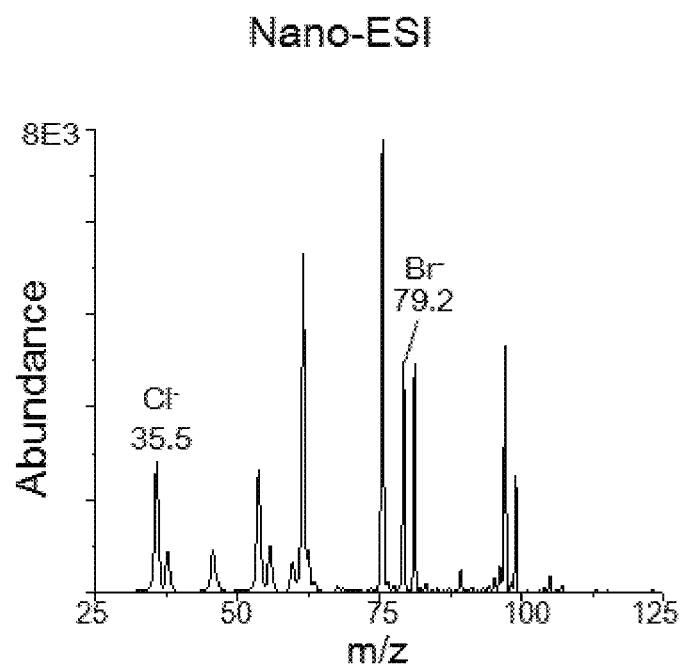
Figure 4C:
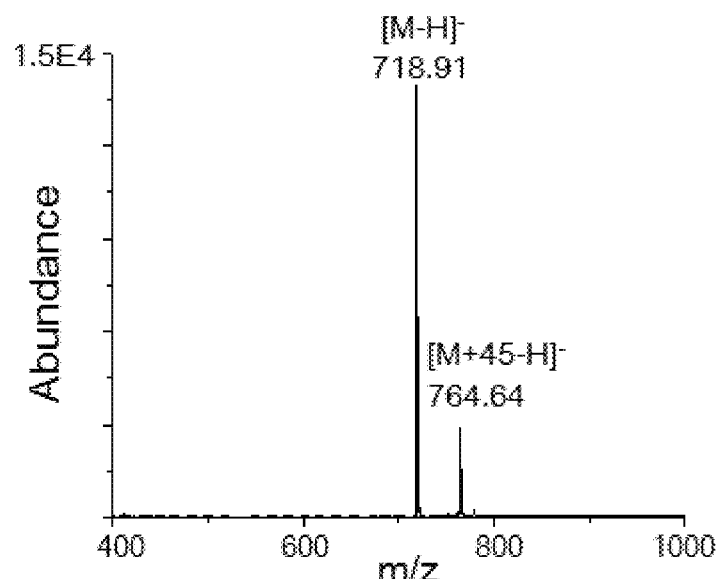
Figure 4D:
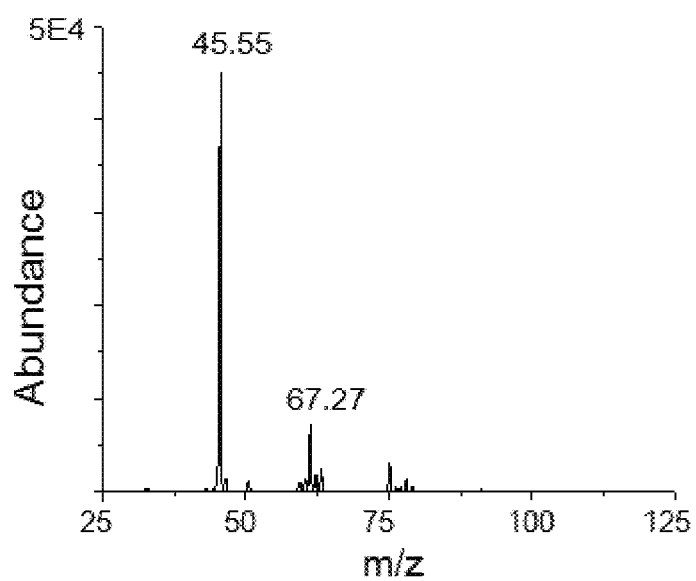

Analyte ions that are generated using negative spray voltages are also vulnerable to adducts such as chloride and bromide (FIGS. 4A-B). Removal of these species can be performed in the same manner as in the positive mode; however, using the opposite potentials whereby, the rear electrode, has a high positive voltage and the front electrode is set to −1.5 kV. In this experiment, 1 μg/mL of carfilzomib was prepared in 15 μg/mL NaCl, 15 μg/mL CaCl$_2$, and 60 μg/mL (CH$_3$)$_4$NBr and after exposure to the desalting potential, the peaks corresponding to these anionic adducts were greatly reduced (FIGS. 4C-D). However, there was an adduct at M+45 which is believed to form from adventitious formate and presumably, cycling the desalting potential would remove this interferent as it did in the case for the organic cations. The desalted signal in the negative ion mode lasted for approximately 10 mins, which is sufficient for many MS experiments. Negative mode analysis was successfully extended to common environment contaminants, perfluorinated organic acids: perfluorooctanoic acid (PFOA, 1 μg/mL), perfluorononanoic acid (PFNA, 1 μg/mL), and perfluoroheptanoic acid (PFHA, 1 μg/mL) in 10 mg/mL NaCL (FIGS. 9A-9B).

Figure 5A:
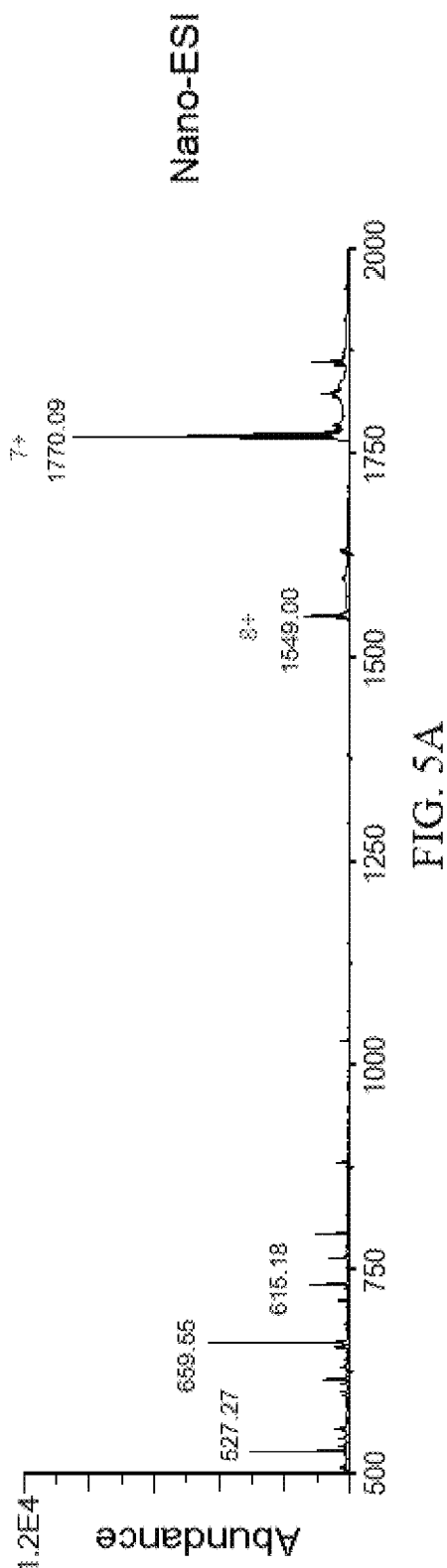
Figure 5B:
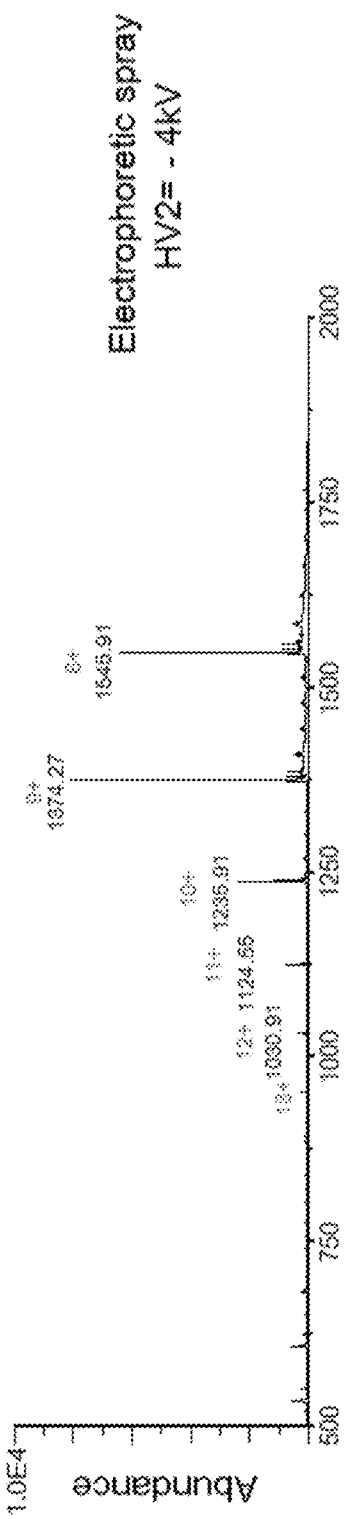
Figure 5C:
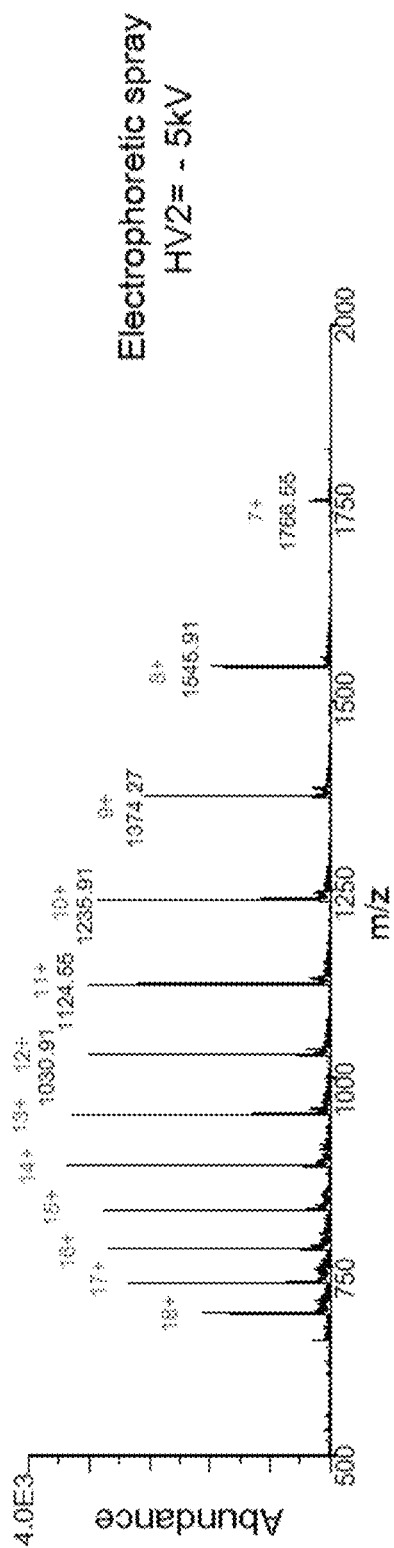

Lastly, the electrophoretic spray protocol was applied to cytochrome C prepared in 1:1 methanol:water without addition of salt. When analyzed via nESI, the 7+ and 8+ charge state was highly present in the spectrum (FIG. 5A) but when exposed to the electrophoretic voltage, the charge state was increased. The experiments, which results are shown in FIGS. 5B-C, were performed with a rear electrode potential of −4 kV and −5 kV (offset=2.5 kV and 3.5 kV) respectively. The increase in the charge state of cytochrome C is believed to be attributable to a higher relative proton abundance near the tip of the emitter at the time of analysis. To test this, formic acid was added to a fresh solution of cytochrome C and analyzed via nESI (FIGS. 10A-C). FIGS. 5A-C also illustrated decreased tailing of the peaks suggesting removing of adventitious cationic adducts.

Other experiments were performed to look at what happens to the ions during the electrophoretic separation by changing the MS polarity, see FIGS. 11A-B, 12A-B, and 13A-B.

Electrophoretic nESI was used to reduce the deleterious effects of solution phase ions by sequestering them at the back of the emitter prior to analysis. This technique required a multi-electrode approach to create a potential gradient which induced ion migration. Herein both the offset potential and duration of the separation voltage were varied and optimized. Importantly, this method is suitable for removal of both organic and inorganic cations and anions and compatible with mass spectrometers capable of nano-electrospray ionization.

A particular advantage of the probes of the invention is that they allow sample analysis to be performed without requiring prior preparation or pretreatment of the sample. That is, in some embodiments, the sample can be an untreated test sample. As used herein, the phrase "untreated test sample" refers to a test sample that has not had any prior sample pre-treatment except for, optionally dilution and/or suspension in a solution. In some embodiments, even dilution and suspension are not required and the sample is directly injected into the probes of the invention without any work-up of any type. In some embodiments, a sample can be a pre-processed test sample, for example, supernatant or filtrate resulting from a treatment selected from the group consisting of centrifugation, filtration, thawing, purification, and any combinations thereof. In some embodiments, the test sample can be treated with a chemical and/or biological reagent. Chemical and/or biological reagents can be employed to protect and/or maintain the stability of the sample, including biomolecules (e.g., nucleic acid and protein) therein, during processing. One exemplary reagent is a protease inhibitor, which is generally used to protect or maintain the stability of protein during processing. In some embodiments, the test sample can be a frozen test sample, e.g., a frozen tissue. The frozen sample can be thawed before employing methods, assays and systems described herein. After thawing, a frozen sample can be centrifuged before being subjected to methods, assays and systems described herein. In some embodiments, the test sample is a clarified test sample, for example, by centrifugation and collection of a supernatant comprising the clarified test sample.

Ion Traps and Mass Spectrometers

Any ion trap known in the art can be used in systems of the invention. Exemplary ion traps include a hyperbolic ion trap (e.g., U.S. Pat. No. 5,644,131, the content of which is incorporated by reference herein in its entirety), a cylindrical ion trap (e.g., Bonner et al., International Journal of Mass Spectrometry and Ion Physics, 24(3):255-269, 1977, the content of which is incorporated by reference herein in its entirety), a linear ion trap (Hagar, Rapid Communications in Mass Spectrometry, 16(6):512-526, 2002, the content of which is incorporated by reference herein in its entirety), and a rectilinear ion trap (U.S. Pat. No. 6,838,666, the content of which is incorporated by reference herein in its entirety).

Any mass spectrometer (e.g., bench-top mass spectrometer of miniature mass spectrometer) may be used in systems of the invention and in certain embodiments the mass spectrometer is a miniature mass spectrometer. An exemplary miniature mass spectrometer is described, for example in Gao et al. (Anal. Chem. 2008, 80, 7198-7205), the content of which is incorporated by reference herein in its entirety. In comparison with the pumping system used for lab-scale instruments with thousands of watts of power, miniature mass spectrometers generally have smaller pumping systems, such as a 18 W pumping system with only a 5 L/min (0.3 m³/hr) diaphragm pump and a 11 L/s turbo pump for the system described in Gao et al. Other exemplary miniature mass spectrometers are described for example in Gao et al. (Anal. Chem., 2008, 80, 7198-7205), Hou et al. (Anal. Chem., 2011, 83, 1857-1861), and Sokol et al. (Int. J. Mass Spectrom., 2011, 306, 187-195), the content of each of which is incorporated herein by reference in its entirety.

FIG. 20 is a picture illustrating various components and their arrangement in a miniature mass spectrometer. The control system of the Mini 12 (Linfan Li, Tsung-Chi Chen, Yue Ren, Paul I. Hendricks, R. Graham Cooks and Zheng Ouyang "Miniature Ambient Mass Analysis System" Anal. Chem. 2014, 86 2909-2916, DOI: 10.1021/ac403766c; and 860. Paul I. Hendricks, Jon K. Dalgleish, Jacob T. Shelley, Matthew A. Kirleis, Matthew T. McNicholas, Linfan Li, Tsung-Chi Chen, Chien-Hsun Chen, Jason S. Duncan, Frank Boudreau, Robert J. Noll, John P. Denton, Timothy A. Roach, Zheng Ouyang, and R. Graham Cooks "Autonomous in-situ analysis and real-time chemical detection using a backpack miniature mass spectrometer: concept, instrumentation development, and performance" Anal. Chem., 2014, 86 2900-2908 DOI: 10.1021/ac403765x, the content of each of which is incorporated by reference herein in its entirety), and the vacuum system of the Mini 10 (Liang Gao, Qingyu Song, Garth E. Patterson, R. Graham Cooks and Zheng Ouyang, "Handheld Rectilinear Ion Trap Mass Spectrometer", Anal. Chem., 78 (2006) 5994-6002 DOI: 10.1021/ac061144k, the content of which is incorporated by reference herein in its entirety) may be combined to produce the miniature mass spectrometer shown in FIG. 20. It may have a size similar to that of a shoebox (H20×W25 cm×D35 cm). In certain embodiments, the miniature mass spectrometer uses a dual LIT configuration, which is described for example in Owen et al. (U.S. patent application Ser. No. 14/345,672), and Ouyang et al. (U.S. patent application Ser. No. 61/865,377), the content of each of which is incorporated by reference herein in its entirety.

Discontinuous Atmospheric Pressure Interface (DAPI)

In certain embodiments, the systems of the invention can be operated with a Discontinuous Atmospheric Pressure Interface (DAPI). A DAPI is particularly useful when coupled to a miniature mass spectrometer, but can also be used with a standard bench-top mass spectrometer. Discontinuous atmospheric interfaces are described in Ouyang et al. (U.S. Pat. No. 8,304,718 and PCT application number PCT/US2008/065245), the content of each of which is incorporated by reference herein in its entirety.

Samples

A wide range of heterogeneous samples can be analyzed, such as biological samples, environmental samples (including, e.g., industrial samples and agricultural samples), and food/beverage product samples, etc.

Exemplary environmental samples include, but are not limited to, groundwater, surface water, saturated soil water, unsaturated soil water; industrialized processes such as waste water, cooling water; chemicals used in a process, chemical reactions in an industrial processes, and other systems that would involve leachate from waste sites; waste and water injection processes; liquids in or leak detection around storage tanks; discharge water from industrial facilities, water treatment plants or facilities; drainage and leachates from agricultural lands, drainage from urban land uses such as surface, subsurface, and sewer systems; waters from waste treatment technologies; and drainage from mineral extraction or other processes that extract natural resources such as oil production and in situ energy production.

Additionally exemplary environmental samples include, but certainly are not limited to, agricultural samples such as crop samples, such as grain and forage products, such as soybeans, wheat, and corn. Often, data on the constituents of the products, such as moisture, protein, oil, starch, amino acids, extractable starch, density, test weight, digestibility, cell wall content, and any other constituents or properties that are of commercial value is desired.

Exemplary biological samples include a human tissue or bodily fluid and may be collected in any clinically acceptable manner. A tissue is a mass of connected cells and/or extracellular matrix material, e.g. skin tissue, hair, nails, nasal passage tissue, CNS tissue, neural tissue, eye tissue, liver tissue, kidney tissue, placental tissue, mammary gland tissue, placental tissue, mammary gland tissue, gastrointestinal tissue, musculoskeletal tissue, genitourinary tissue, bone marrow, and the like, derived from, for example, a human or other mammal and includes the connecting material and the liquid material in association with the cells and/or tissues. A body fluid is a liquid material derived from, for example, a human or other mammal. Such body fluids include, but are not limited to, mucous, blood, plasma, serum, serum derivatives, bile, blood, maternal blood, phlegm, saliva, sputum, sweat, amniotic fluid, menstrual fluid, mammary fluid, peritoneal fluid, urine, semen, and cerebrospinal fluid (CSF), such as lumbar or ventricular CSF. A sample may also be a fine needle aspirate or biopsied tissue. A sample also may be media containing cells or biological material. A sample may also be a blood clot, for example, a blood clot that has been obtained from whole blood after the serum has been removed.

In one embodiment, the biological sample can be a blood sample. Such samples can be analyzes as untreated test samples. In other embodiments, the sample is a blood sample, from which plasma or serum can be extracted. The blood can be obtained by standard phlebotomy procedures and then separated. Typical separation methods for preparing a plasma sample include centrifugation of the blood sample. For example, immediately following blood draw, protease inhibitors and/or anticoagulants can be added to the blood sample. The tube is then cooled and centrifuged, and can subsequently be placed on ice. The resultant sample is separated into the following components: a clear solution of blood plasma in the upper phase; the buffy coat, which is a thin layer of leukocytes mixed with platelets; and erythrocytes (red blood cells). Typically, 8.5 mL of whole blood will yield about 2.5-3.0 mL of plasma.

Blood serum is prepared in a very similar fashion. Venous blood is collected, followed by mixing of protease inhibitors and coagulant with the blood by inversion. The blood is allowed to clot by standing tubes vertically at room temperature. The blood is then centrifuged, wherein the resultant supernatant is the designated serum. The serum sample should subsequently be placed on ice.

Prior to analyzing a sample, the sample may be purified, for example, using filtration or centrifugation. These techniques can be used, for example, to remove particulates and chemical interference. Various filtration media for removal of particles includes filer paper, such as cellulose and membrane filters, such as regenerated cellulose, cellulose acetate, nylon, PTFE, polypropylene, polyester, polyethersulfone, polycarbonate, and polyvinylpyrolidone. Various filtration media for removal of particulates and matrix interferences includes functionalized membranes, such as ion exchange membranes and affinity membranes; SPE cartridges such as silica- and polymer-based cartridges; and SPE (solid phase extraction) disks, such as PTFE- and fiberglass-based. Some of these filters can be provided in a disk format for loosely placing in filter holdings/housings, others are provided within a disposable tip that can be placed on, for example, standard blood collection tubes, and still others are provided in the form of an array with wells for receiving pipetted samples. Another type of filter includes spin filters. Spin filters consist of polypropylene centrifuge tubes with cellulose acetate filter membranes and are used in conjunction with centrifugation to remove particulates from samples, such as serum and plasma samples, typically diluted in aqueous buffers.

Filtration is affected in part, by porosity values, such that larger porosities filter out only the larger particulates and smaller porosities filtering out both smaller and larger porosities. Typical porosity values for sample filtration are the 0.20 and 0.45 μm porosities. Samples containing colloidal material or a large amount of fine particulates, considerable pressure may be required to force the liquid sample through the filter. Accordingly, for samples such as soil extracts or wastewater, a pre-filter or depth filter bed (e.g. "2-in-1" filter) can be used and which is placed on top of the membrane to prevent plugging with samples containing these types of particulates.

In some cases, centrifugation without filters can be used to remove particulates, as is often done with urine samples. For example, the samples are centrifuged. The resultant supernatant is then removed and frozen.

After a sample has been obtained and purified, the sample can be analyzed to determine the concentration of one or more target analytes, such as elements within a blood plasma sample. With respect to the analysis of a blood plasma sample, there are many elements present in the plasma, such as proteins (e.g., Albumin), ions and metals (e.g., iron), vitamins, hormones, and other elements (e.g., bilirubin and uric acid). Any of these elements may be detected using methods of the invention. More particularly, methods of the invention can be used to detect molecules in a biological sample that are indicative of a disease state.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

EXAMPLES

Example 1: Use of Probes of the Invention to Desalt a Sample

Figure 2E:
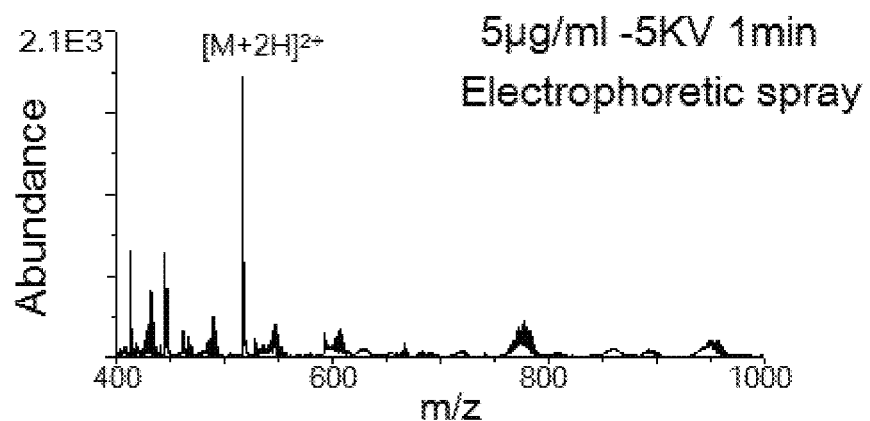
Figure 2F:
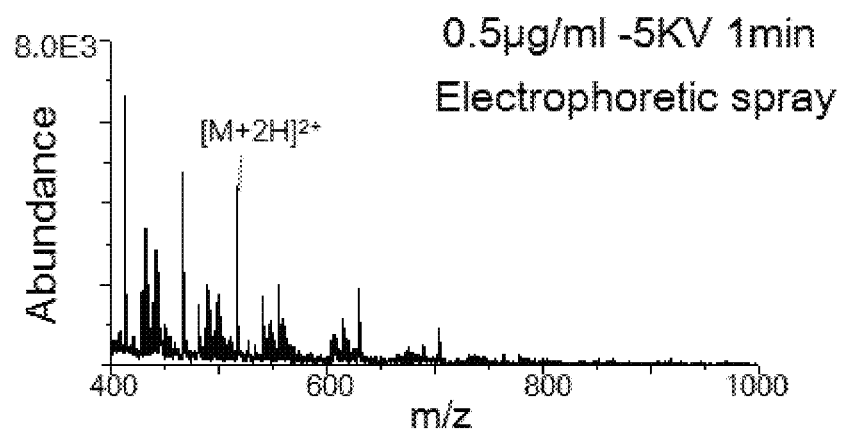

FIG. 2A shows traditional nano-ESI mass spectra recorded at 1.5 kV and averaged for 1 min for 5 μg/ml bradykinin in 104 μg/mL aqueous NaCl. FIG. 2B is as in FIG. 2A but using 0.5 g/mL bradykinin. FIG. 2C as in FIG. 2A but with 0.1% formic acid. FIG. 2D as in FIG. 2B but with 0.1% formic acid. FIG. 2E is electrophoretic spray of the same solution as in FIG. 2A and same spray voltage (HV1) of 1.5 kV after application for 1 min and removal of −5 kV separation voltage (HV2). FIG. 2F is electrophoretic spray of the same solution as in FIG. 2B with spray voltage (HV1) of 1.5 kV and after application for 1 min and removal of −5 kV separation voltage (HV2). Ion abundances are given in instrument counts.

Example 2: Multicycle Desalination

Figure 3A:
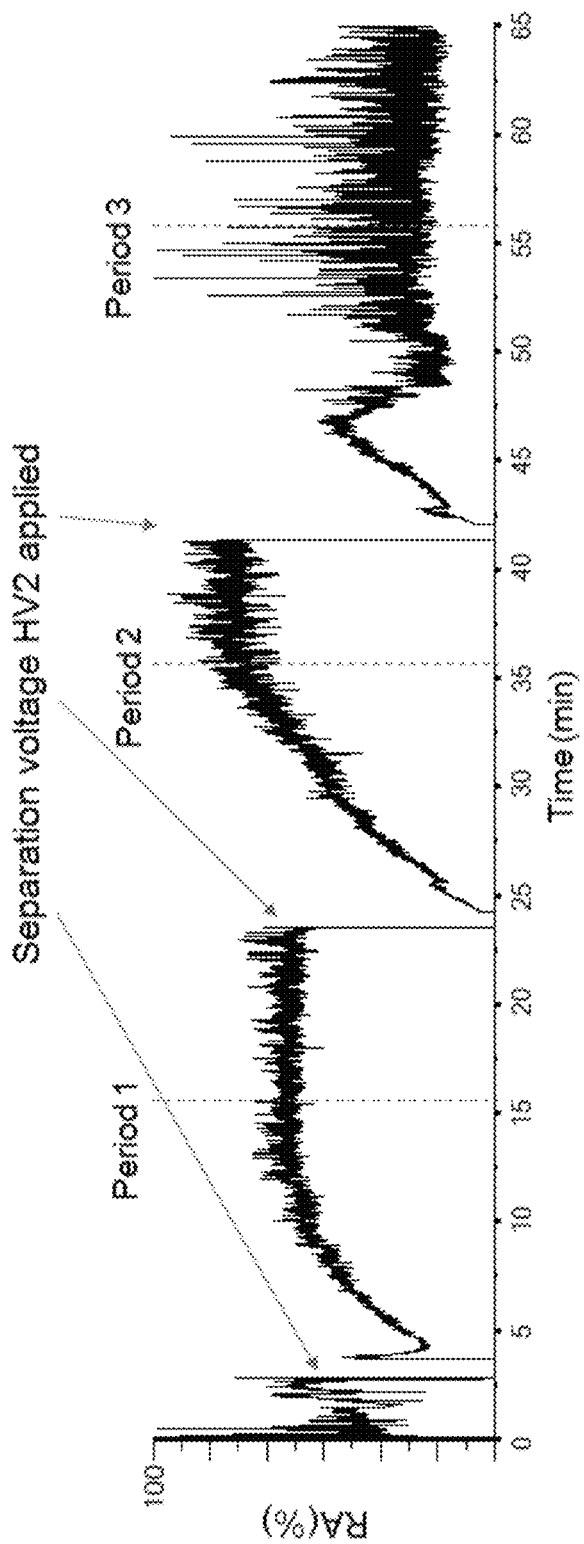
Figure 3B:
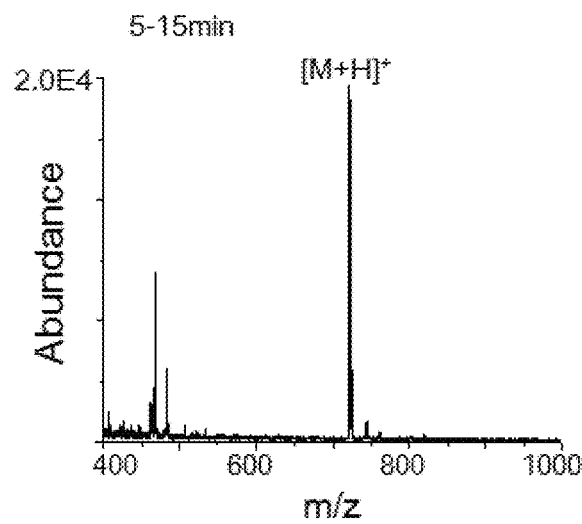
Figure 3C:
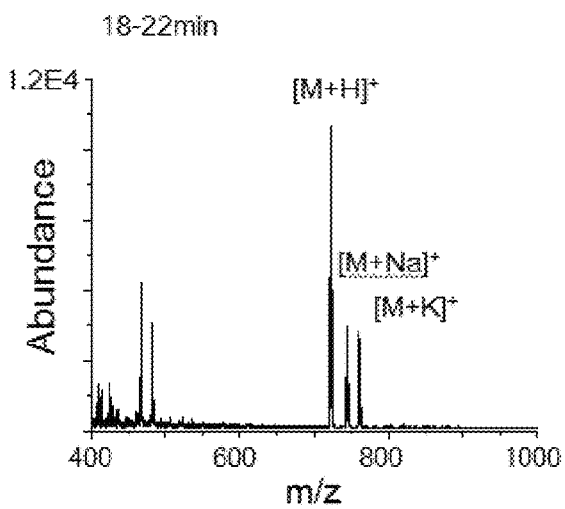
Figure 3D:
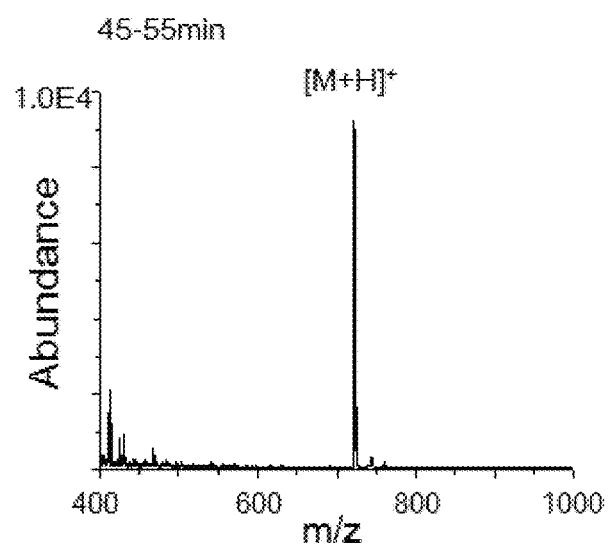

FIG. 3A is a total ion chronogram and average electrophoretic spray mass spectra during multiple cycles of desalination. FIG. 3B is an average mass spectrum recorded during 5-15 min of the first cycle, showing only protonated peptide. FIG. 3C is a 18-22 min showing appearance of $Na^+$ and $K^+$ adducts. FIG. 3D 45-55 min, showing removal of $Na^+$ and $K^+$ adducts by the third cycle of cleaning. Separation voltage HV2 was turned on for 10 seconds at the beginning of each cycle. The three dashed lines indicate the time at which the $Na^+$ and $K^+$ adducts reappear in the spectra. Sample: 1 μg/mL carfilzomib in 10 μg/mL NaCl and 20 μg/mL KCl.

Example 3: Operation in Negative Ion Mode

FIGS. 4A-D are mass spectra in negative ion mode for 1 μg/mL carfilzomib M=719.91 in 15 μg/mL NaCl, 15 μg/mL $CaCl_2$ and 60 μg/mL $(CH_3)_4NBr$. FIG. 4A shows traditional nano-ESI mass spectrum recorded at −1.5 kV with averaging for 1 min. FIG. 4B is as in FIG. 4A but showing low mass range. FIG. 4C shows electrophoretic spray of the same solution as in FIG. 4A but with spray voltage (HV1) of −1.5 kV and after application for 1 min then removal of 5 kV separation voltage (HV2). FIG. 4D is as in FIG. 4B but showing low mass range. Ion abundances are given in instrument counts.

Example 4: Analysis of Cytochrome C Sample Using Probes of the Invention

FIG. 5A shows traditional nano-ESI mass spectrum recorded at 1.5 kV and averaged for 1 min for 50 μg/mL Cytochrome C. FIG. 5B shows electrophoretic spray of the same solution as in FIG. 5A but with spray voltage (HV1) of 1.5 kV and after application for 1 min and then removal of −4 kV separation voltage (HV2). FIG. 5C shows electrophoretic spray of the same solution as in FIG. 5A but with spray voltage (HV1) of 1.5 kV and after application for 1 min and then removal of −5 kV separation voltage (HV2). Ion abundances are given in instrument counts.

Example 5: Analysis of Carfilzomib Sample Using Probes of the Invention

Figure 6A:
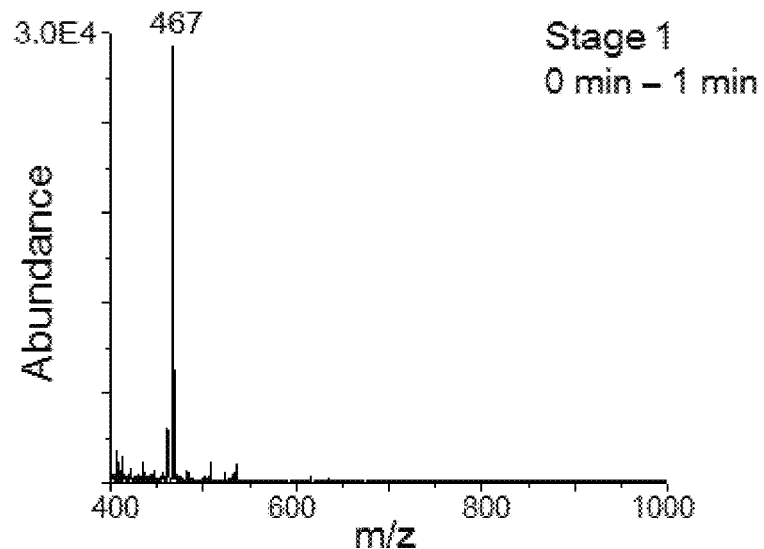
Figure 6B:
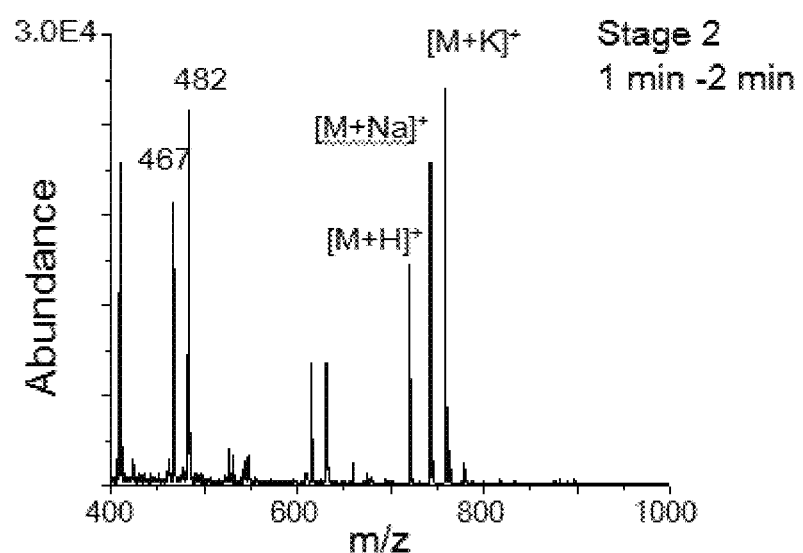
Figure 6C:
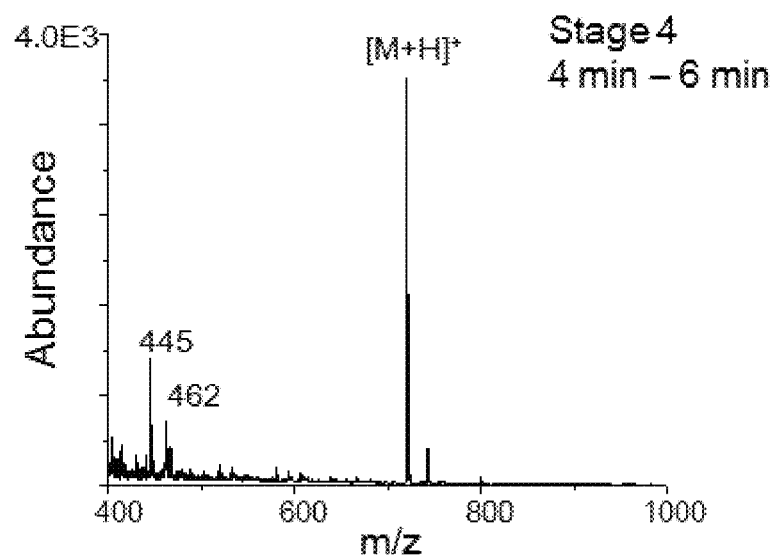
Figure 6D:
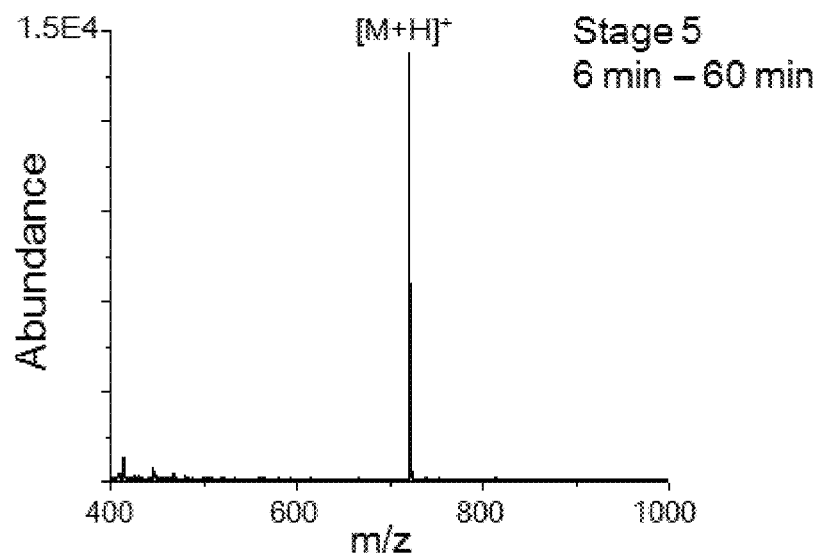

FIGS. 6A-D show four stages of electrophoretic spray for 1 g/ml carfilzomib in 10 g/mL NaCl and 20 μg/mL. Spray voltage HV1 was 1.5 kV, separation voltage HV2 was turned on for 1 min at start of stage 3 and then removed. FIG. 6A shows average mass spectrum recorded during the first stage, 0 min-1 min, showing only background peaks from solvent. FIG. 6B shows stage 2: 1 min-2 min mass spectrum showing appearance of all the analytes and matrix peaks. In stage 3, separation voltage was applied again but no signal could be observed in positive ion mode. FIG. 6C shows stage 4: 4 min-6 min protonated ion seen and gradually increased after removal of HV2. FIG. 6D shows stage 5: average mass spectrum recorded during period 6 min-60 min showing the protonated molecule as the base peak, the mass spectra was stable and free of salt cationic adducts.

Example 6: Mixture Analysis Using Probes of the Invention

FIG. 7A shows traditional nano-ESI mass spectrum recorded at 1.5 kV and averaged for 2 min for peptide mixture ($M_1$:[D-Ala$^2$]-Leucine encephalin 10 µg/mL; $M_2$: (Val$^5$)-angiotensin I 10 µg/mL and M3: bradykinin 5 µg/mL). FIG. 7B shows electrophoretic spray of the same solution as in FIG. 7A also with spray voltage (HV1) of 1.5 kV but after application for 1 min and then removal of −5 kV separation voltage (HV2). Ion abundances are given in instrument counts. [D-Ala$^2$]-Leucine encephalin: m/z 570, $[M_1+H]$; m/z 592, $[M_1+Na]^+$; (Val$^5$)-angiotensin I: m/z 642, $[M_2+2H]^{2+}$, m/z 653, $[M_2+2Na]^{2+}$; Bradykinin: m/z 517, $[M_3+2H]^{2+}$; m/z 528, $[M_3+2Na]^{2+}$.

Example 7: Different Conditions for Operation of Probes of the Invention

FIG. 8A shows traditional nano-ESI mass spectra recorded at 1.5 kV and averaged for 2 min. FIG. 8b shows electrophoretic spray of the same solution as in FIG. 8A with spray voltage (HV1) of 1.5 kV but after application for 1 min and removal of −5 kV separation voltage (HV2), showing the ability to remove inorganic salts. FIG. 8C shows electrophoretic spray of the same solution as in FIG. 8A with spray voltage (HV1) of 1.5 kV but after application for 2 min of −5 kV separation voltage (HV2), showing the ability of remove organic salts. Sample: Didodecyldimethyl ammonium bromide 1 µg/mL, Tetra-n-butyl ammonium iodide 1 µg/mL, [D-Ala$^2$]-Leucine encephalin 5 µg/mL. Unknown compound MW 222 Da, contributes to background, m/z 223, 245.

FIG. 9A shows traditional nano-ESI mass spectra recorded at −2 kV and averaged for 1 min. FIG. 9B shows electrophoretic spray of the same solution as in FIG. 9A with spray voltage (HV1) of −2 kV but after application for 1 min and removal of 6 kV separation voltage (HV2). Ion abundances are given in instrument counts. Sample mixture: perfluoroheptanoic acid (PFHA) 1 µg/mL, perfluorooctanoic acid (PFOA) 1 µg/mL, perfluorononanoic acid (PFNA) 1 µg/mL in 104 µg/mL aqueous NaCl.

Example 8: Analysis of Samples Including Formic Acid Using Probes of the Invention FIG. 10A shows traditional nano-ESI mass spectra recorded at 1.5 kV and averaged for 1 min for 50 µg/mL cytochrome C with addition of 100 µg/mL formic acid. FIG. 10B is as in FIG. 10A with 10 µg/mL formic acid. FIG. 10C shows electrophoretic spray of 50 µg/mL cytochrome C with spray voltage (HV1) of 1.5 kV and after application for 1 min and removal of −5 kV separation voltage (HV2). Ion abundances are given in instrument counts.

Example 9: Changing the MS Polarity

FIG. 11A shows traditional nano-ESI mass spectra recorded at 1.5 kV and averaged for 1 min for 5 µg/mL caffeine, 20 µg/mL Asp-Leu and 1 µg/mL reserpine in 50 µg/mL aqueous NaCl. FIG. 11B shows electrophoretic spray of the same sample as FIG. 11A with spray voltage (HV1) of 1.5 kV and after application for 1 min and removal of −5 kV separation voltage (HV2). Ion abundances are given in instrument counts. Unknown compound MW 222 Da, contributes to background, m/z 223, 245.

FIGS. 12A-B show electrophoretic spray mass spectra recorded after application of positive separation voltage with detection in the negative ion mode. FIG. 12A: Spray voltage (HV1) of 1.5 kV after application of −1 kV separation voltage (HV2). FIG. 12B: Spray voltage (HV1) 1.5 kV with application of −5 kV separation voltage (HV2). Sample: 1 µg/mL carfilzomib with 15 µg/mL NaCl, 15 µg/mL $CaCl_2$ and 60 µg/mL $(CH_3)_4NBr$.

FIGS. 13A-B show electrophoretic spray mass spectra recorded after application of negative ion separation voltage but with positive ion detection. FIG. 13A: spray voltage (HV1) of −1.5 kV and application of 1 kV separation voltage (HV2). FIG. 13B: −1.5 kV spray voltage HV1 and with application of +5 kV separation voltage (HV2). Sample: 1 µg/mL carfilzomib with 15 µg/mL NaCl, 15 µg/mL $CaCl_2$ and 60 µg/mL $(CH_3)_4NBr$.

Example 10: Analysis of Proteins and Peptides Using Systems of the Invention

The electrophoretic spray protocol was applied to cytochrome C prepared in 1:1 methanol:water without addition of salt. When analyzed via nESI, the 7+ and 8+ charge state was highly present in the spectrum (FIG. 14A) but when exposed to the electrophoretic voltage, the charge state was increased. FIGS. 14B-C were recorded with a rear electrode potential of −4 kV and −5 kV (offset=2.5 kV and 3.5 kV) respectively. The increase in the charge state of cytochrome C is attributed to a higher relative proton abundance near the tip of the emitter at the time of analysis. To test this, formic acid was added to a fresh solution of cytochrome C and analyzed via nESI (FIGS. 15A-C). FIGS. 14A-C also illustrate decreased tailing of the peaks, suggesting removal of adventitious cationic adducts. The amplified spectrum of the 8+ charged peak showed that Na$^+$ adducts were remarkably more abundant than the protonated cytochrome C ions generated using traditional nESI. Multiple Na$^+$ ions were bonded with cytochrome C molecules. In comparison, after removal of the separation voltage, the signal intensity of protonated 8+ charged ions was significantly enhanced and protonated ions became the most abundant species which indicates that this method effectively reduced the signal intensity of salt adducts to a very low level. We also operated the system under conditions typically used in protein solution chemistry, i.e. using 150 mM KCl and 25 mM Tris-HCl buffer at pH 7, a buffer which mimics the intracellular environment6 but is normally inimical to successful mass spectrometry.

The same KCl/Tris-HCl buffer system has been used to compare our method against the reduced capillary size method of Wang et al. (Monitoring Glycosylation Profile and Protein Titer in Cell Culture Samples Using Zipchip CE-MS. J Anal Bioanal Tech, 2017, 8(359): 2). As seen by comparing FIGS. 16A and C with FIGS. 16B and D, electrophoretic desalting significantly improved the signal to noise of cytochrome C and myoglobin. A comparable result was reported for yeast alcohol dehydrogenase (ADH), bovine serum albumin (BSA) and other proteins when using a quadrupole-time-of-flight (Q-TOF) instrument and using small emitter tips. In this case the protein ion signal occurred in the m/z 4000 to 8000 range and was enhanced by the small initial droplet size. We were not able to ionize very large proteins using the ion trap mass spectrometer, but in the m/z 1000 to 2000 range effective electrophoretic desalting was seen. This region appeared not to be effectively desalted in prior experiments using prior art techniques.

Other experiments were performed to elucidate ion behavior during electrophoretic separation by changing the MS polarity. This method of sample cleanup works well for removal of other solution-phase ions, besides the salt peaks; for example, some matrix peaks are also removed from the mass spectra. However, based on the result of small molecules mixtures, non-charged matrix constituents will continue to appear in the MS (FIGS. 17A-B). As for the mechanism of desalting, to provide evidence at to what happens in the system when applying the separation voltage (the stage during which we have no observable signal), we switched to the opposite detection mode during this 1 minute period. The results in FIGS. 18A-B and FIGS. 19A-B prove that during the application of the separation voltage, the spray is still occurring and that the separation voltage does indeed attract positive ions to the rear of the glass capillary and away from the spray tip.

Example 11: pH Study

It is known that the charge states of proteins ions observed in mass spectrometry bear some relationship to their native structures, and that the higher charge stages of the protein are a result of more extended protein conformations in the gas phase. Since the change of charge states was observed in the work for FIGS. 7A-B it was of interest to study the pH of the solution on a protein spectrum. Attempts were made to use litmus paper to measure the pH of the solution in the capillary but the limited volume made the color change difficult to observe. To solve this problem two experiments were conducted with different amounts of formic acid (100 µg/mL and 10 µg/mL) spiked into the protein sample and the results were compared with those when applying HV2. In FIGS. 15A-C it can be clearly seen that, the mass spectrum obtained after two min application of HV2 (FIG. 15C) is intermediate between those using 100 µg/mL (FIG. 15A) and 10 µg/mL (FIG. 15B) formic acid. This experiment proves that the pH changes after HV2 is applied as the charge state distribution is between 100 µg/mL and 10 µg/mL. So we conclude that the pH after application of HV2 was between these two values.

Example 12: Small Molecule Mixture

To demonstrate effect of removal of matrix, a mixture containing three types of small molecules with 50 µg/mL sodium chloride was tested. The first type of small molecule, 5 µg/mL caffeine (M. W. 194), has a strong tendency to form a sodium adduct. The second small molecule, Asp-Leu (M. W. 246) 20 µg/mL, is always suppressed by salt background. The third small molecule reserpine (M. W. 608, 1 µg/mL) is not influenced by low concentrations of salts. As shown in FIGS. 17A-B, after applying −5 KV HV2 for 1 minute, the caffeine sodium adduct at m/z 245 was removed the peak m/z 223, due to the protonated molecule showed up in the electrophoretic mass spectrum. This change made the signal for Asp-Leu become recognizable. However, the reserpine signal remained unchanged. These result may suggest that non-charged matrix constituents will continue to appear in the mass spectrum after electrophoretic salt removal.

Example 13: Mechanistic Exploration

To further understand the processes resulting upon application of the separation voltage, during which no signal can be observed, we switched to the opposite detection mode of LTQ during this one-minute period. FIGS. 18A-B show the obtained mass spectrum when the spray voltage HV1 was set to 1.5 kV and the separation voltage HV2 was set to −1 kV and −5 kV. Once we switched from the positive detection mode to the negative detection mode, the signal was observed. This indicate that the spray continues even with the application of the separation voltage and the separation voltage attracts that the positive ions to the back part of the glass capillary. FIGS. 19A-B were collected when the spray voltage was −1.5 kV and the separation voltage was positive.

What is claimed is:

1. A method for analyzing a sample, the method comprising:
providing a liquid sample reservoir that is coupled to a first electrode;
providing a power source coupled to the first electrode;
providing a mass spectrometry probe comprising: a hollow body comprising a distal tip; and a second electrode, wherein the second electrode is disposed within the hollow body;
providing an electrically conductive hollow conduit that is coupled at a first end to the liquid sample reservoir, wherein the electrically conductive conduit has a length such that it extends into the hollow body of the mass spectrometry probe;
introducing a liquid sample comprising a small molecule and a plurality of liquid-phase ions into the liquid sample reservoir;
causing the liquid sample to be moved from the liquid sample reservoir and into the hollow body via the hollow conduit such that a gap is maintained between the liquid sample and the second electrode;
applying a positive voltage to the hollow conduit via voltage from the first electrode being applied to the liquid sample reservoir needle which operably applies the voltage to the hollow conduit, while transporting the liquid sample from the liquid sample reservoir through the hollow conduit and into the hollow body, wherein the liquid sample is polarized as the liquid sample flows through the hollow conduit and into in the hollow body;
inductively applying a negative voltage from the second electrode across the gap to the liquid sample, thereby causing the plurality of liquid-phase ions to separate from the small molecule within the hollow body but not within the hollow conduit;
terminating the negative voltage from the second electrode while maintaining the positive voltage to the hollow conduit to thereby cause the small molecule to be emitted from the distal tip and become ionized; and
analyzing the ionized small molecule in a mass spectrometer.

2. The method of claim 1, wherein there is an offset of at least-1 V between the first and second electrode during operation of the first and second electrode.

3. The method of claim 1, wherein the voltage is applied to the first and second electrode for at least 10 seconds.

4. The method of claim 1, wherein the voltage is applied to the first and second electrode for at least 15 minutes.

5. The method of claim 1, wherein multiple cycles of voltage application to the first and second electrode is performed.

6. The method of claim 1, wherein the liquid sample reservoir is a syringe that comprises a needle.

7. The method of claim 6, wherein the first electrode is coupled to the needle.

8. The method of claim 1, wherein the liquid sample is a biological sample.

9. The method of claim 8, wherein the biological sample is blood or urine.

10. The method of claim 1, wherein applying voltage from the electrode causes the plurality of liquid-phase ions to migrate toward the electrode.

* * * * *